United States Patent
Miyasaka et al.

(10) Patent No.: US 10,991,319 B2
(45) Date of Patent: Apr. 27, 2021

(54) ELECTRO-OPTICAL DEVICE AND ELECTRONIC APPARATUS

(71) Applicant: SEIKO EPSON CORPORATION, Tokyo (JP)

(72) Inventors: Mitsutoshi Miyasaka, Suwa (JP); Yoichi Momose, Matsumoto (JP); Kiyoshi Sekijima, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/595,573

(22) Filed: Oct. 8, 2019

(65) Prior Publication Data

US 2020/0111425 A1 Apr. 9, 2020

(30) Foreign Application Priority Data

Oct. 9, 2018 (JP) .............................. JP2018-190652
Mar. 8, 2019 (JP) .............................. JP2019-042316

(51) Int. Cl.
*G09G 3/32* (2016.01)
*G09G 3/3291* (2016.01)
*G02B 27/01* (2006.01)
*G09G 3/3258* (2016.01)
*G09G 3/3266* (2016.01)

(52) U.S. Cl.
CPC ......... *G09G 3/3291* (2013.01); *G02B 27/017* (2013.01); *G09G 3/3258* (2013.01); *G09G 3/3266* (2013.01); *G02B 2027/0178* (2013.01)

(58) Field of Classification Search
CPC ........................................................ G09G 3/32
See application file for complete search history.

(56) References Cited

U.S. PATENT DOCUMENTS

| | | | |
|---|---|---|---|
| 2002/0070913 A1 | 6/2002 | Kimura et al. | |
| 2002/0140642 A1 | 10/2002 | Okamoto | |
| 2003/0174106 A1 | 9/2003 | Tanada et al. | |
| 2006/0103323 A1* | 5/2006 | Eom .................... | G09G 3/3233 315/169.3 |

(Continued)

FOREIGN PATENT DOCUMENTS

| | | |
|---|---|---|
| JP | 2002-287695 A | 10/2002 |
| JP | 2003-271100 A | 9/2003 |

(Continued)

*Primary Examiner* — Joseph R Haley
(74) *Attorney, Agent, or Firm* — Oliff PLC

(57) ABSTRACT

Provided are a scan line, a data line, a pixel circuit provided corresponding to an intersection between the scan line and the data line, and an enable line. The pixel circuit includes a memory circuit, a light-emitting element, and an enable line driving circuit, the light-emitting element changes luminance in accordance with an image signal retained in the memory circuit, the enable line driving circuit controls a light emission enabled state of the light-emitting element, the pixel circuit includes a first pixel circuit, a second pixel circuit, a third pixel circuit, and a fourth pixel circuit, the enable line includes a first enable line and a second enable line, the first pixel circuit and the second pixel circuit are electrically connected with the first enable line, and the third pixel circuit and the fourth pixel circuit are electrically connected with the second enable line.

16 Claims, 13 Drawing Sheets

(56) References Cited

U.S. PATENT DOCUMENTS

| | | |
|---|---|---|
| 2006/0145964 A1* | 7/2006 | Park .................... G09G 3/3233 345/76 |
| 2006/0238134 A1 | 10/2006 | Park et al. |
| 2006/0274090 A1 | 12/2006 | Koyama et al. |
| 2007/0159417 A1 | 7/2007 | Miyake |
| 2007/0268286 A1 | 11/2007 | Tanada et al. |
| 2008/0043005 A1 | 2/2008 | Kanda |

FOREIGN PATENT DOCUMENTS

| | | |
|---|---|---|
| JP | 2004-062199 A | 2/2004 |
| JP | 2004-163601 A | 6/2004 |
| JP | 2006-309182 A | 11/2006 |
| JP | 2007-065614 A | 3/2007 |
| JP | 2007-206681 A | 8/2007 |
| JP | 2008-083680 A | 4/2008 |
| JP | 2016-031431 A | 3/2016 |

* cited by examiner

| | |
|---|---|
| NUMBER M OF ROWS | 2,160 |
| NUMBER N OF COLUMNS | 1,280 |
| NUMBER M X N OF PIXELS | 2,764,800 |
| FRAME FREQUENCY f | 60Hz |
| ONE FRAME PERIOD 1/f | 16.67 msec |
| ONE SCANNING LINE SELECTION PERIOD S | 0.167 μsec |
| ONE VERTICAL PERIOD VP = SxM | 0.36 msec |
| BIT NUMBER g OF GRADATION | 16 bit |

| | | | | | |
|---|---|---|---|---|---|
| NON-DISPLAY PERIOD P1-1 OF SF1 | 0.3598 msec | DISPLAY PERIOD P2-1 OF SF1 | 0.0002 msec | TOTAL PERIOD OF SF1 | 0.36 msec |
| NON-DISPLAY PERIOD P1-2 OF SF2 | 0.3596 msec | DISPLAY PERIOD P2-2 OF SF2 | 0.0004 msec | TOTAL PERIOD OF SF2 | 0.36 msec |
| NON-DISPLAY PERIOD P1-3 OF SF3 | 0.3592 msec | DISPLAY PERIOD P2-3 OF SF3 | 0.0008 msec | TOTAL PERIOD OF SF3 | 0.36 msec |
| NON-DISPLAY PERIOD P1-4 OF SF4 | 0.3584 msec | DISPLAY PERIOD P2-4 OF SF4 | 0.0016 msec | TOTAL PERIOD OF SF4 | 0.36 msec |
| NON-DISPLAY PERIOD P1-5 OF SF5 | 0.3568 msec | DISPLAY PERIOD P2-5 OF SF5 | 0.0032 msec | TOTAL PERIOD OF SF5 | 0.36 msec |
| NON-DISPLAY PERIOD P1-6 OF SF6 | 0.3536 msec | DISPLAY PERIOD P2-6 OF SF6 | 0.0064 msec | TOTAL PERIOD OF SF6 | 0.36 msec |
| NON-DISPLAY PERIOD P1-7 OF SF7 | 0.3472 msec | DISPLAY PERIOD P2-7 OF SF7 | 0.0128 msec | TOTAL PERIOD OF SF7 | 0.36 msec |
| NON-DISPLAY PERIOD P1-8 OF SF8 | 0.3344 msec | DISPLAY PERIOD P2-8 OF SF8 | 0.0256 msec | TOTAL PERIOD OF SF8 | 0.36 msec |
| NON-DISPLAY PERIOD P1-9 OF SF9 | 0.3088 msec | DISPLAY PERIOD P2-9 OF SF9 | 0.0512 msec | TOTAL PERIOD OF SF9 | 0.36 msec |
| NON-DISPLAY PERIOD P1-10 OF SF10 | 0.2575 msec | DISPLAY PERIOD P2-10 OF SF10 | 0.1025 msec | TOTAL PERIOD OF SF10 | 0.36 msec |
| NON-DISPLAY PERIOD P1-11 OF SF11 | 0.1551 msec | DISPLAY PERIOD P2-11 OF SF11 | 0.2049 msec | TOTAL PERIOD OF SF11 | 0.36 msec |
| NON-DISPLAY PERIOD P1-12 OF SF12 | 0.0002 msec | DISPLAY PERIOD P2-12 OF SF12 | 0.4099 msec | TOTAL PERIOD OF SF12 | 0.41 msec |
| NON-DISPLAY PERIOD P1-13 OF SF13 | 0.0002 msec | DISPLAY PERIOD P2-13 OF SF13 | 0.8198 msec | TOTAL PERIOD OF SF13 | 0.82 msec |
| NON-DISPLAY PERIOD P1-14 OF SF14 | 0.0002 msec | DISPLAY PERIOD P2-14 OF SF14 | 1.6396 msec | TOTAL PERIOD OF SF14 | 1.64 msec |
| NON-DISPLAY PERIOD P1-15 OF SF15 | 0.0002 msec | DISPLAY PERIOD P2-15 OF SF15 | 3.2791 msec | TOTAL PERIOD OF SF15 | 3.28 msec |
| NON-DISPLAY PERIOD P1-16 OF SF16 | 0.0002 msec | DISPLAY PERIOD P2-16 OF SF16 | 6.5583 msec | TOTAL PERIOD OF SF16 | 6.56 msec |
| TOTAL NON-LIGHT EMISSION PERIOD | 3.551 msec | TOTAL LIGHT-EMISSION ENABLED PERIOD | 13.116 msec | TOTAL | 16.67 msec |

| | |
|---|---|
| NUMBER OF DISPLAY GRADATIONS | 65,536 GRADATIONS |
| TOTAL NUMBER OF DISPLAY COLORS | 281474976710656 COLORS |

FIG. 8

ELECTRO-OPTICAL DEVICE AND ELECTRONIC APPARATUS

The present application is based on, and claims priority from JP Application Serial Number 2018-190652, filed Oct. 9, 2018, and 2019-042316, filed Mar. 8, 2019, the disclosures of which are hereby incorporated by reference herein in its entirety.

BACKGROUND

1. Technical Field

The present disclosure relates to an electro-optical device and an electronic apparatus.

2. Related Art

In recent years, a head-mounted display (HMD) of a type that directs image light from an electro-optical device to eyes of an observer, has been proposed. In such an electronic apparatus, an electro-optical device such as an organic electro luminescence (EL) device is used, and for an organic EL device, high-resolution, multiple grey scalesgray-scale display, low-power consumption, and the like are required.

In a typical organic EL device, when a selection transistor sets to an ON-state by a scanning signal, an image signal is introduced into a gate of a driving transistor. The amount of current flowing through the driving transistor and an organic EL element is determined in accordance with the potential of the signal, and the organic EL element emits light at a luminance in accordance with the amount of current. In this way, a gray scale is expressed by analog driving in the typical organic EL device. Thus, due to variation in the voltage-current characteristics and the threshold voltage of the driving transistor, a low display quality, such as an occurrence of variation in brightness and deviation in gray scales between respective pixels, has been aimed to be resolved.

To address the above, as described in JP-A-2002-287695, an organic EL device that includes a static memory circuit for each of the respective pixels and performs display by digital driving has been proposed. In this organic EL device, when an output of the memory circuit is High, a light-emitting element emits light, while the output is Low, the light-emitting element is turned off. A signal having been input to the memory circuit during a selection period is kept retained during a non-selection period, and the light-emitting element maintains a light emission state or a turned-off state until a new signal is input during a next selection period.

However, in the organic EL device described in JP-A-2002-287695, the light-emitting element switches between states of light emission and non-light emission during a period in which the signal is being written into the memory circuit, making it difficult to strictly control a light emission period and a non-light emission period. That is, there have been issues of difficulty in accurately expressing gray scale by time-division driving and in performing a multiple grey scalesgray-scale display.

SUMMARY

An electro-optical device of the present disclosure includes a scan line, a data line, a pixel circuit provided corresponding to an intersection between the scan line and the data line, and an enable line, wherein the pixel circuit includes a memory circuit, a light-emitting element, and a control circuit, the light-emitting element is configured to change luminance in accordance with an image signal retained in the memory circuit, the control circuit is configured to control a light emission enabled state of the light-emitting element, the pixel circuit includes a first pixel circuit, a second pixel circuit, a third pixel circuit, and a fourth pixel circuit, the enable line includes a first enable line and a second enable line, the first pixel circuit and the second pixel circuit are electrically connected with the first enable line, and the third pixel circuit and the fourth pixel circuit are electrically connected with the second enable line.

The electro-optical device described above may be configured such that the scan line is supplied with a selection signal or a non-selection signal, when the selection signal is supplied, the pixel circuit sets the data line and the memory circuit into a conductive state, and when the non-selection signal is supplied, the pixel circuit sets the data line and the memory circuit into a non-conductive state, a second selection period in which the selection signal is supplied to the second pixel circuit is provided after a first selection period in which the selection signal is supplied to the first pixel circuit, and a first activation period in which an activation signal is supplied to the first enable line is provided after the second selection period.

The electro-optical device described above may be configured such that the first activation period starts within one vertical period from a time at which the first selection period starts.

The electro-optical device described above may be configured such that a third selection period in which the selection signal is supplied to the third pixel circuit is provided after the second selection period, and the first activation period and the third selection period have an overlapped period.

The electro-optical device described above may be configured such that a fourth selection period in which the selection signal is supplied to the fourth pixel circuit is provided after the third selection period, and a second activation period in which the activation signal is supplied to the second enable line is provided after the fourth selection period.

The electro-optical device described above may be configured such that the enable line is supplied with an activation signal or a non-activation signal, the control circuit sets the light-emitting element into a state of being configured to emit light when the activation signal is supplied, and a time at which the activation signal starts being supplied to the first enable line differs from a time at which the activation signal starts being supplied to the second enable line.

The electro-optical device described above may be configured such that a time difference between the time at which the activation signal starts being supplied to the first enable line and the time at which the activation signal starts being supplied to the second enable line is shorter than one vertical period.

The electro-optical device described above may be configured such that the first pixel circuit, the second pixel circuit, the third pixel circuit, and the fourth pixel circuit are arranged along a second direction, and the enable line extends in a first direction intersecting the second direction.

The electro-optical device described above may be configured such that the light-emitting element included in the first pixel circuit and the light-emitting element included in the third pixel circuit display a first color, and the light-emitting element included in the second pixel circuit and the light-emitting element included in the fourth pixel circuit display a second color.

An electronic apparatus according to the present application includes the electro-optical device described above.

BRIEF DESCRIPTION OF THE DRAWINGS

FIG. 8 is a table describing a time-division gray scale method of the electro-optical device.

DESCRIPTION OF EXEMPLARY EMBODIMENTS

Embodiments will be described below with reference to the accompanying drawings.

First Embodiment

Outline of Electronic Apparatus

Figure 1:
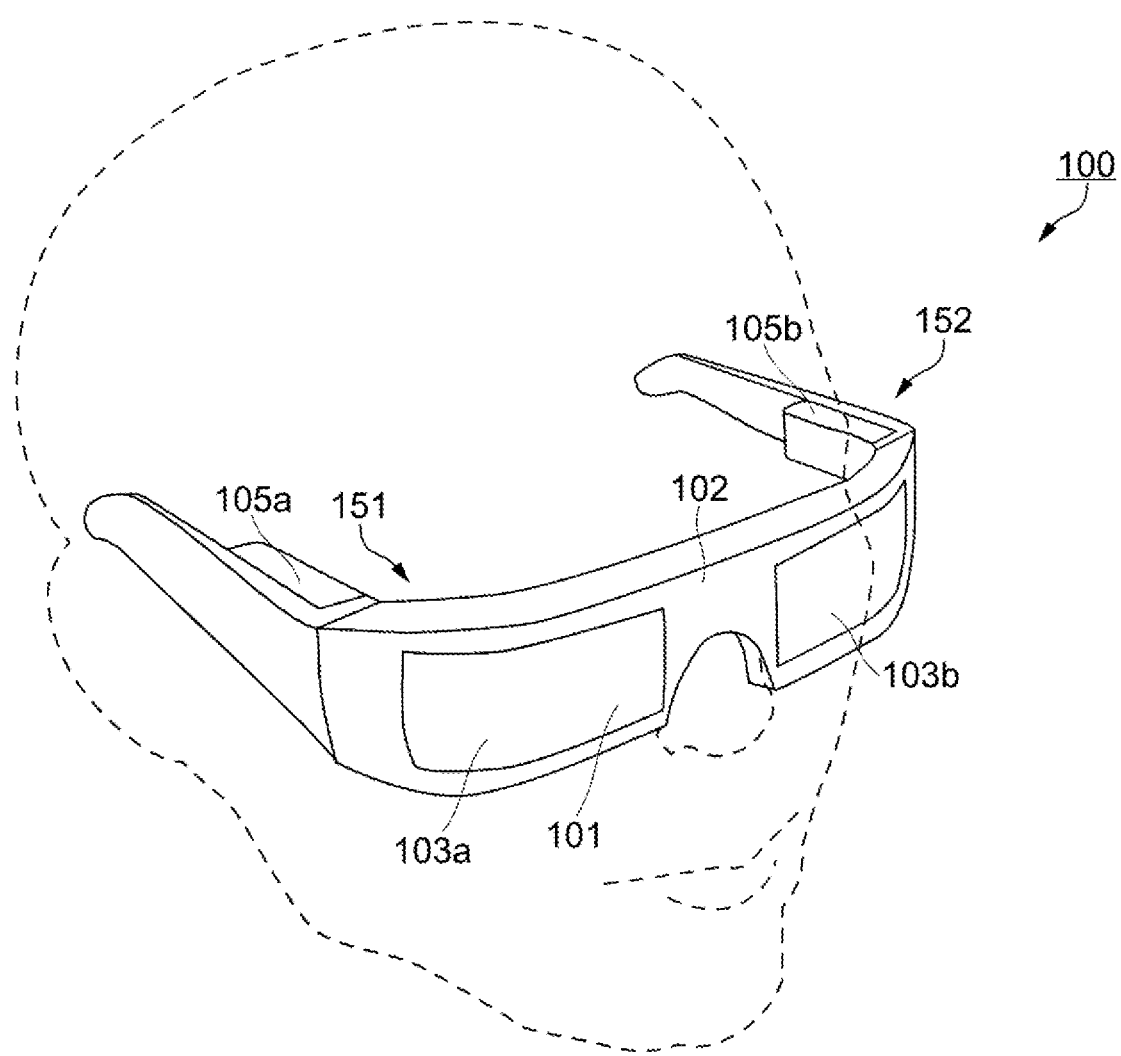
FIG. 1 is a diagram describing an outline of an electronic apparatus according to a first embodiment.

FIG. 1 is a schematic diagram illustrating a configuration of an electronic apparatus according to the present embodiment. The configuration of the electronic apparatus will be described with reference to FIG. 1.

A head-mounted display 100 illustrated in FIG. 1 is an example of the electronic apparatus. The head-mounted display 100 has an appearance similar to eye-glasses, and includes a see-through member 101 for covering the front of eyes of the user, a frame 102 for supporting the see-through member 101, and a first built-in device unit 105a and a second built-in device unit 105b provided at the back of both right and left ends of the frame 102. The see-through member 101 is separated into a first optical portion 103a and a second optical portion 103b. A first display apparatus 151, which includes a combination of the first optical portion 103a and the first built-in device unit 105a, is a part for displaying images for a right eye. A second display apparatus 152, which includes a combination of the second optical portion 103b and the second built-in device unit 105b, is a part for displaying images for a left eye.

Internal Structure of Electronic Apparatus

Figure 2:
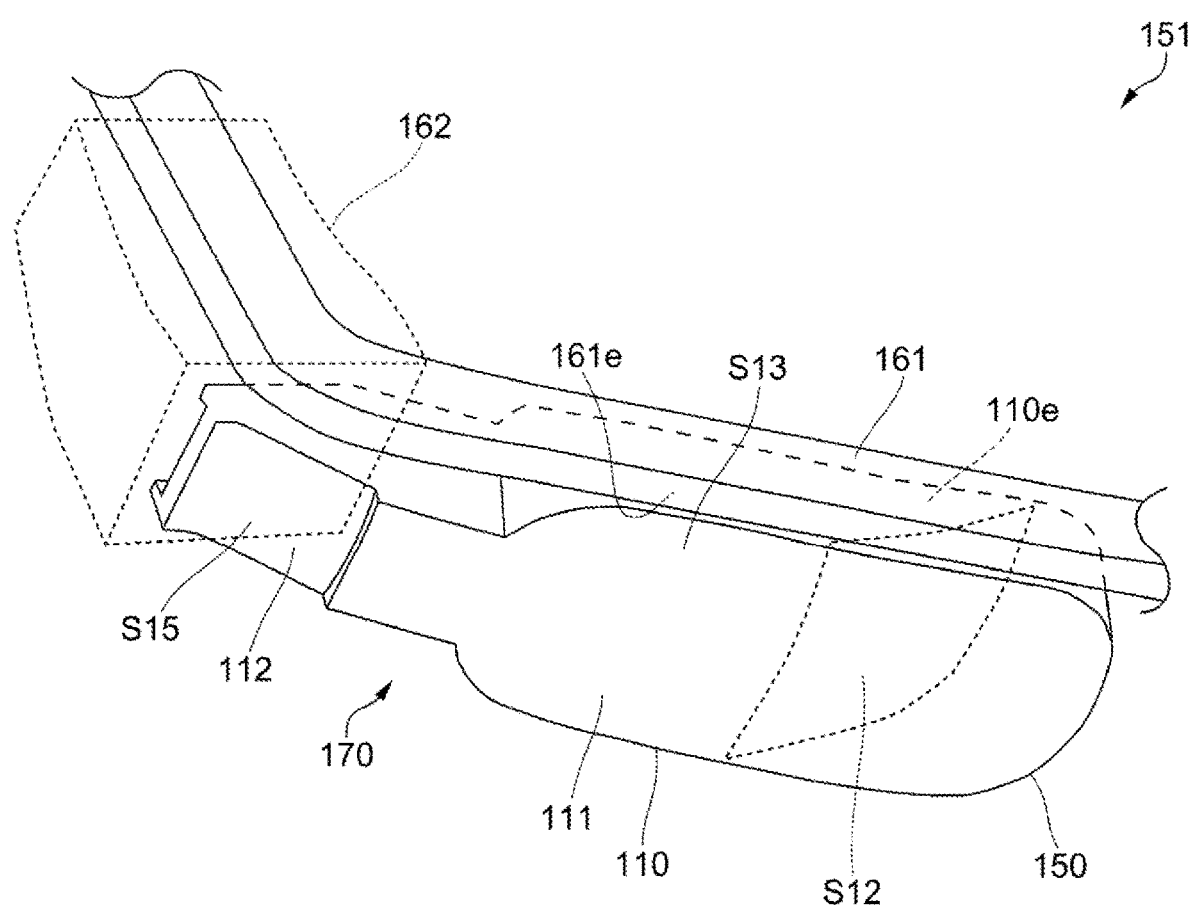
FIG. 2 is a diagram describing an internal structure of the electronic apparatus.
Figure 3:
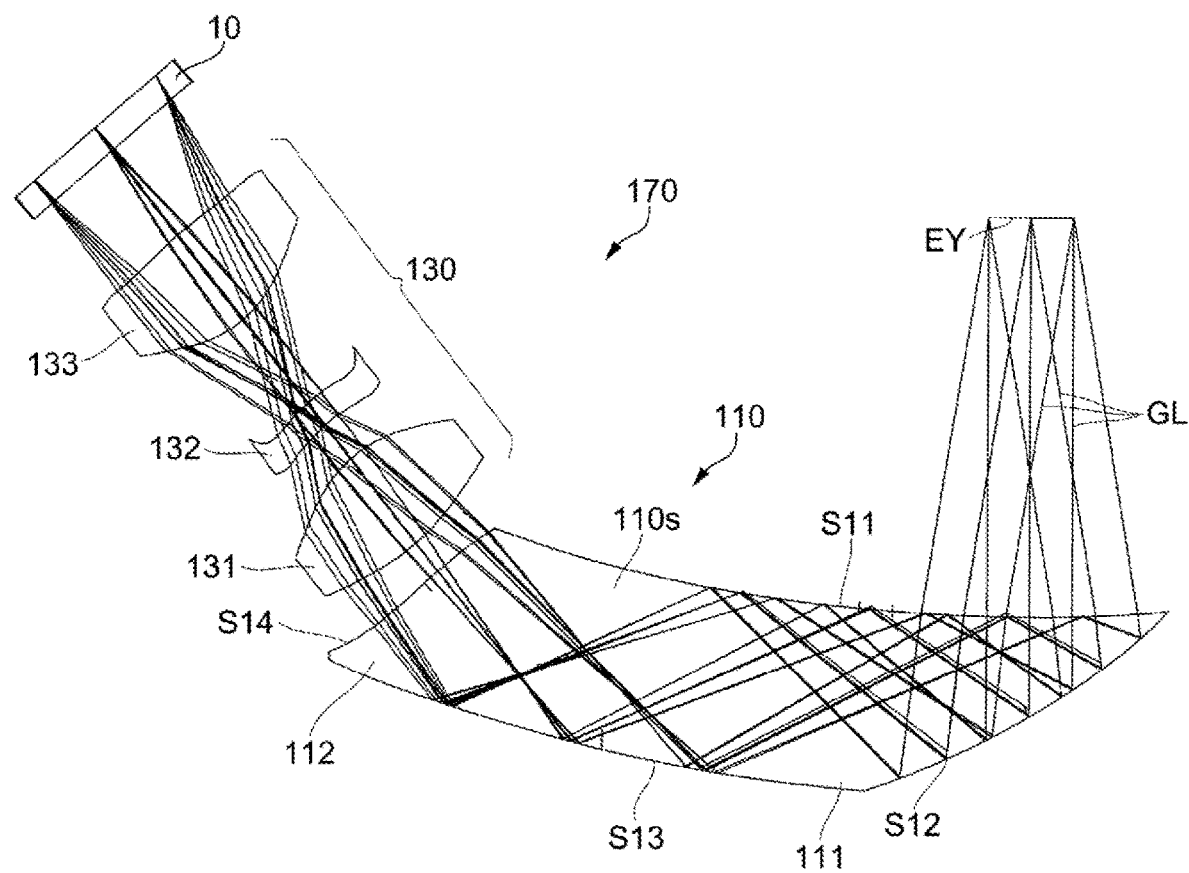
FIG. 3 is a diagram describing an optical system of the electronic apparatus.

FIG. 2 is a diagram describing an internal structure of the electronic apparatus according to the present embodiment. FIG. 3 is a diagram describing an optical system of the electronic apparatus according to the present embodiment. The internal structure and the optical system of the electronic apparatus will now be described with reference to FIG. 2 and FIG. 3. Note that the first display apparatus 151 and the second display apparatus 152 are configured to be bilaterally symmetrical to each other, and have substantially the same structure. Accordingly, the first display apparatus 151 is herein described as an example of the electronic apparatus, and detailed description of the second display apparatus 152 is omitted.

As illustrated in FIG. 2, the first display apparatus 151 includes an electro-optical device 10 illustrated in FIG. 3, a prism 110, a light transmissive member 150, and a projection lens 130 for image formation (see FIG. 3). The prism 110 and the light transmissive member 150 correspond to the first optical portion 103a, while the projection lens 130 and the electro-optical device 10 correspond to the first built-in device unit 105a. As illustrated in FIG. 3, the projection lens 130 includes three lenses 131, 132, and 133 along an incident-side optical axis, and causes image light GL emitted from the electro-optical device 10 to be incident into the prism 110, to thus re-form an image on an eye EY.

An electronic apparatus of a type such as the head-mounted display 100 is required to be compact and light-weight. Further, the electro-optical device 10 to be used for such an electronic apparatus is required to display images with high-resolution and multiple gray scales at low-power consumption.

Configuration of Electro-Optical Device

Figure 4:
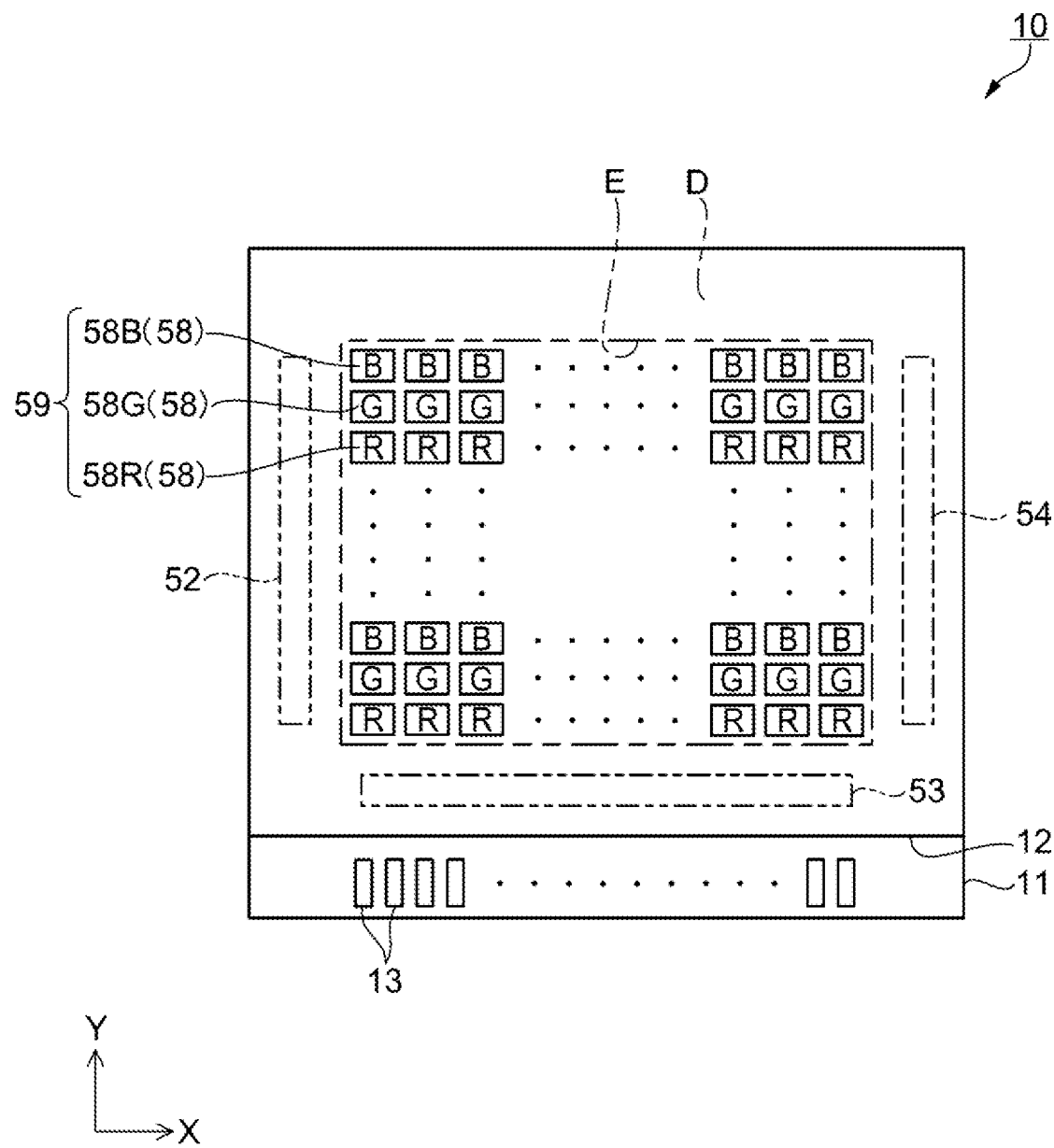
FIG. 4 is a schematic plan diagram illustrating a configuration of an electro-optical device.

A configuration of the electro-optical device will now be described with reference to FIG. 4. FIG. 4 is a schematic plan diagram illustrating the configuration of the electro-optical device according to the present embodiment. The present embodiment will be described on an example in which the electro-optical device 10 is an organic EL device including an organic EL element as a light-emitting element.

As illustrated in FIG. 4, the electro-optical device 10 according to the present embodiment includes a first substrate 11 and a second substrate 12. The first substrate 11 is provided with active elements such as a transistor and a diode, and passive elements such as a resistance and a capacitor. Thus, the first substrate 11 is also referred to as an element substrate. The second substrate 12 is a substrate with optical transparency, and is composed of, for example, a quartz substrate or transparent glass. The second substrate 12 serves to protect or seal the first substrate 11, and is referred to as a protective substrate or an opposing substrate. The first substrate 11 is provided with a non-illustrated color filter. The first substrate 11 and the second substrate 12 are arranged to face each other and bonded together.

In the present embodiment, the first substrate 11 is composed of a semiconductor substrate such as a single crystalline silicon substrate. The first substrate 11 includes a display region E and a non-display region D surrounding the display region E. The display region E is a region that contributes to displaying, while the non-display region D is a region that does not contribute to actual displaying. In the display region E, a sub-pixel 58B for emitting blue (B) light, a sub-pixel 58G for emitting green (G) light, and a sub-pixel 58R for emitting red (R) light are arranged in a matrix pattern. The sub-pixel 58B, the sub-pixel 58G, and the sub-pixel 58R are each provided with a light-emitting element 20 illustrated in FIG. 9. In the electro-optical device 10, a pixel 59 including the sub-pixel 58B, the sub-pixel 58G, and the sub-pixel 58R forms a display unit to display color images. Note that in the present specification, the sub-pixel 58B, the sub-pixel 58G, and the sub-pixel 58R may be collectively referred to as sub-pixels 58 without distinction.

The first substrate 11 is larger in size than the second substrate 12, where a plurality of external coupling terminals 13 are aligned along a first side of the first substrate 11, the first side being located out of the second substrate 12. A data line driving circuit 53 is provided between the plurality of external coupling terminals 13 and the display region E. A scan line driving circuit 52 is provided between a second side orthogonal to the first side and the display region E. Further, an enable line driving circuit 54 is provided between a third side that is orthogonal to the first side and that is opposite to the second side, and the display region E.

In the present specification, the direction along the first side in which the external coupling terminals 13 are aligned is defined as a first direction or an X direction, and the direction along the second side and the third side, which are orthogonal to the first side, is defined as a second direction or a Y direction. In the present embodiment, a horizontal stripe arrangement is employed, in which the sub-pixels 58, from which light emission of the same color is obtained, are aligned in the first direction (X direction), and the sub-pixels 58 from which light emission of different colors is obtained, are aligned in the second direction (Y direction). Note that, the arrangement of the sub-pixels 58 in the second direction is not limited to the order of B, G, and R illustrated in FIG. 4, and may be, for example, the order of R, G, and B. Further, the arrangement of the sub-pixels 58 is not limited to the stripe arrangement and may be a delta arrangement, a Bayer arrangement or an S-stripe arrangement, and the like. In addition, the sub-pixels 58B, 58G and 58R are not limited to the same shape or size.

Circuit Configuration of Electro-Optical Device

Figure 5:
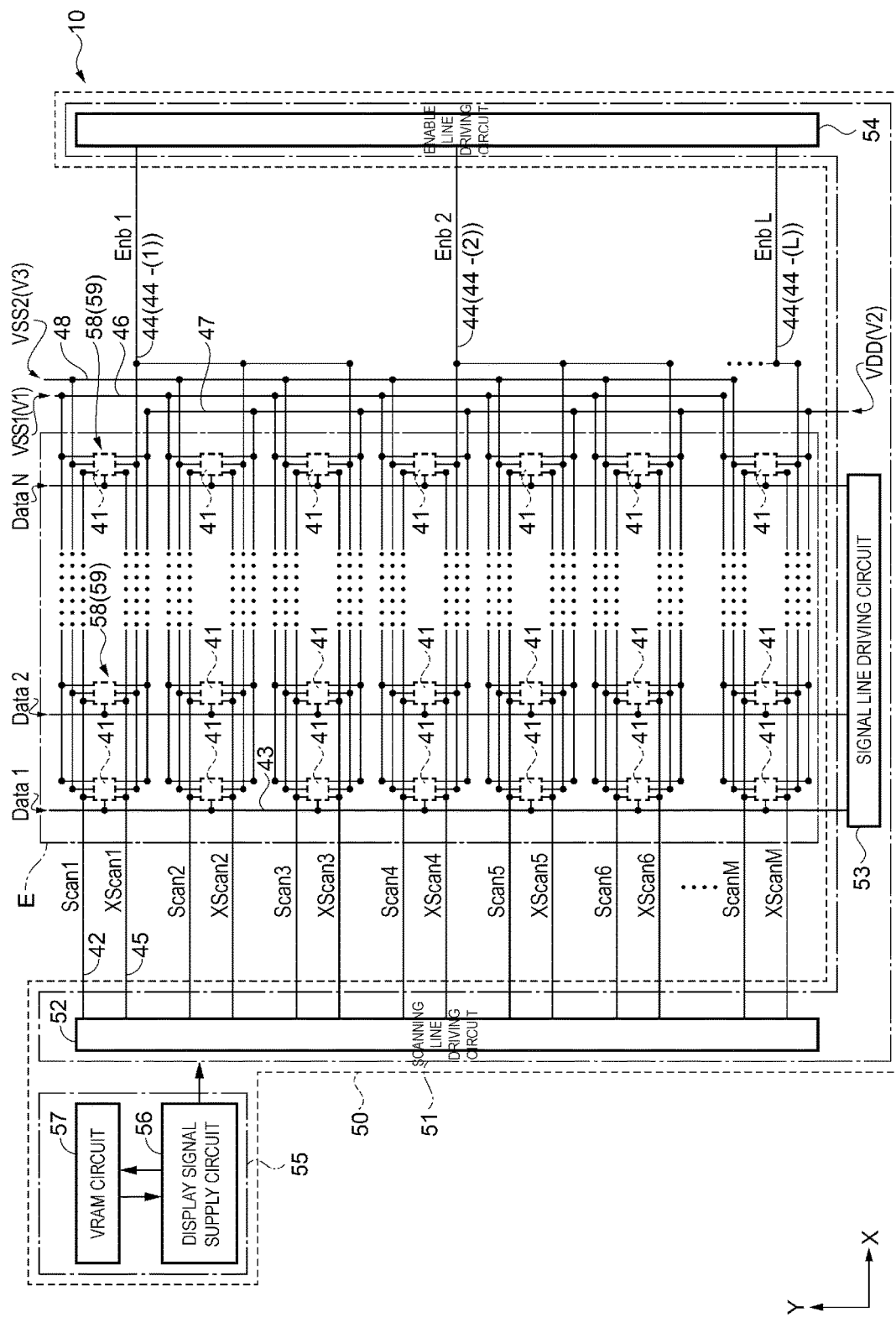
FIG. 5 is a circuit block diagram of the electro-optical device.

A circuit configuration of the electro-optical device will now be described with reference to FIG. 5. FIG. 5 is a basic circuit block diagram of the electro-optical device according to the present embodiment. Note that the circuit block diagram illustrated in FIG. 5 is a circuit diagram illustrating an electrical coupling, and does not represent an actual wiring line layout.

As illustrated in FIG. 5, in the display region E of the electro-optical device 10, a plurality of first scan lines 42 and a plurality of data lines 43 intersecting with each other are formed, and a plurality of sub-pixels 58 are arranged in a matrix pattern corresponding to the respective intersections of the first scan lines 42 and the data lines 43. Each of the sub-pixels 58 is provided with a pixel circuit 41 including the light-emitting element 20 (see FIG. 9), and the like.

In the display region E, second scan lines 45 are formed corresponding to the first scan lines 42. Further, in the display region E, enable lines 44 are formed corresponding to the pixels 59. The first scan lines 42, the second scan lines 45, and the enable lines 44 extend in the X direction. The data lines 43 extend in the Y direction.

In the electro-optical device 10, the sub-pixels 58 of M rows×N columns is arranged in a matrix pattern in the display region E. Specifically, the display region E is formed with M of the first scan lines 42, M of the second scan lines 45, L of the enable lines 44, and N of the data lines 43. Note that, L, M, and N are integers equal to or greater than two, where it is set, as an example, such that M=720×p, L=M/r=720, and N=1280 in the present embodiment. Where p represents the number of basic colors of the display, and is an integer equal to or greater than two. In the present embodiment, the basic colors of the display are three colors of R, G, and B, where p=3. Where r is the number of rows of the sub-pixels 58 that share one type of the enable line 44, where r=p=3 in the present embodiment. That is, the enable lines 44 are wiring lines that differ for each of the display units, which is, for each of the pixels 59. The sub-pixels 58 of p=r pieces constituting one of the pixel 59 are supplied with the same enable signal.

The electro-optical device 10 includes a drive unit 50 outside the display region E. The drive unit 50 supplies various signals to the respective pixel circuits 41 arranged in the display region E, to thus cause the display region E to display images. The drive unit 50 includes a driving circuit 51 and a signal-processing unit 55. The signal-processing unit 55 supplies display signals to the driving circuit 51. The driving circuit 51 supplies drive signals to the respective pixel circuits 41 via the plurality of first scan lines 42, the plurality of second scan lines 45, the plurality of data lines 43, and the plurality of the enable lines 44, based on the display signals.

The non-display region D and the display region E are arranged with a first low potential line 46, a high potential line 47, and a second low potential line 48. In the present embodiment, the first low potential line 46 supplies a first potential, as a first potential line, to the respective pixels 59, the high potential line 47 supplies a second potential, as a second potential line, to the respective pixels 59, and the second low potential line 48 supplies a third potential, as a third potential line, to the respective pixels 59. In the present embodiment, the first potential V1 is the first low potential VSS1, the second potential V2 is the high potential VDD, and the third potential V3 is the second low potential VSS2. As an example, it is set such that V1=VSS1=4.0V, V2=VDD=7.0V, and V3=VSS2=0V. The first potential is lower than the second potential and the third potential is lower than the first potential. The first potential (the first low potential VSS1) and the second potential (the high potential VDD) constitute a low-voltage power-supply, and the third potential (the second low potential VSS2) and the second potential (the high potential VDD) constitute a high-voltage power-supply.

The driving circuit 51 includes the scan line driving circuit 52, the data line driving circuit 53, and the enable line driving circuit 54. The driving circuit 51 and the pixel circuit 41 are formed at the first substrate 11. Specifically, the driving circuit 51 and the pixel circuit 41 are formed from elements such as a transistor and the like, which are formed at the monocrystalline silicon wafer.

The scan line driving circuit 52 is electrically connected with the first scan line 42 and the second scan line 45. The scan line driving circuit 52 outputs a scanning signal (Scan) that causes the pixel circuit 41 to be selected or unselected to the respective first scan lines 42 that extend in the first direction, and the respective first scan lines 42 transmit the scanning signal to the pixel circuit 41. The scanning signal has a selection state in which a second transistor 32 (see FIG. 9) is set to an ON-state, and a non-selection state in which the second transistor 32 is set to an OFF-state. In the present embodiment, the second transistor 32 is P-type, thus, the scanning signal (selection signal) in the selection state is Low, while the scanning signal (non-selection signal) in the non-selection state is High.

The scan line driving circuit 52 outputs a second scanning signal (XScan) that sets the pixel circuit 41 to signal retained or no-signal retained to the respective second scan lines 45 that extend in the first direction, and the respective second scan lines 45 transmit the second scanning signal to the pixel circuit 41. The second scanning signal includes a retention signal for setting a third transistor 33 (see FIG. 9) to an ON-state and a non-retention signal for setting the third transistor 33 to an OFF-state. In the present embodiment, the third transistor 33 is P-type, thus, the second scanning signal (retention signal) for setting to the signal retained is Low, and the second scanning signal (non-retention signal) for setting to the no-signal retained is High.

Note that, when specifying a scanning signal supplied to the first scan line 42 in the i-th row among the M of the first scan lines 42, the scanning signal is denoted as scanning signal Scani in the i-th row. Similarly, when specifying a second scanning signal supplied to the second scan line 45 in the i-th row among the M of the second scan lines 45, the second scanning signal is denoted as second scanning signal XScani in the i-th row. The scan line driving circuit 52 includes a non-illustrated shift register circuit, and a signal for shifting the shift register circuit is output as a shift output signal for each of the stages. This shift output signal is used to form the scanning signal Scan1 in the first row to the scanning signal ScanM in the M-th row, and the second scanning signal XScan1 in the first row to the second scanning signal XScanM in the M-th row.

The data line driving circuit 53 is electrically connected with the data lines 43. The data line driving circuit 53 includes, for example, a shift register circuit, or a decoder circuit, or a multiplexer circuit, which are not illustrated. The data line driving circuit 53 supplies an image signal (Data) to each of the N of the data lines 43 in synchronization with the selection of the first scan lines 42. Note that, when specifying an image signal supplied to the data lines 43 in the j-th column among the N of the data lines 43, the image signal is denoted as image signal Dataj in the j-th column.

The enable line driving circuit 54 is electrically connected with the enable lines 44. The enable line driving circuit 54 supplies an enable signal to each of the L of the enable lines 44. The enable line 44 transmits the enable signal to the corresponding pixel circuit 41. The enable signal has an activation state and a non-activation state. The enable line 44 can be in the activation state as appropriate by receiving the enable signal from the enable line driving circuit 54. In the present embodiment, a fourth transistor 34, which functions as a control circuit, is P-type (see FIG. 9), thus the enable signal (activation signal) in the activation state is Low, and the enable signal (non-activation signal) in the non-activation state is High.

The signal-processing unit 55 includes a display signal supply circuit 56 and a video random access memory (VRAM) circuit 57. The VRAM circuit 57 temporarily stores a frame image and the like. The display signal supply circuit 56 generates display signals from a frame image temporarily stored in the VRAM circuit 57, and supplies the display signals to the driving circuit 51. The display signals include, for example, an image signal and a clock signal.

Configuration of Pixel

Figure 6:
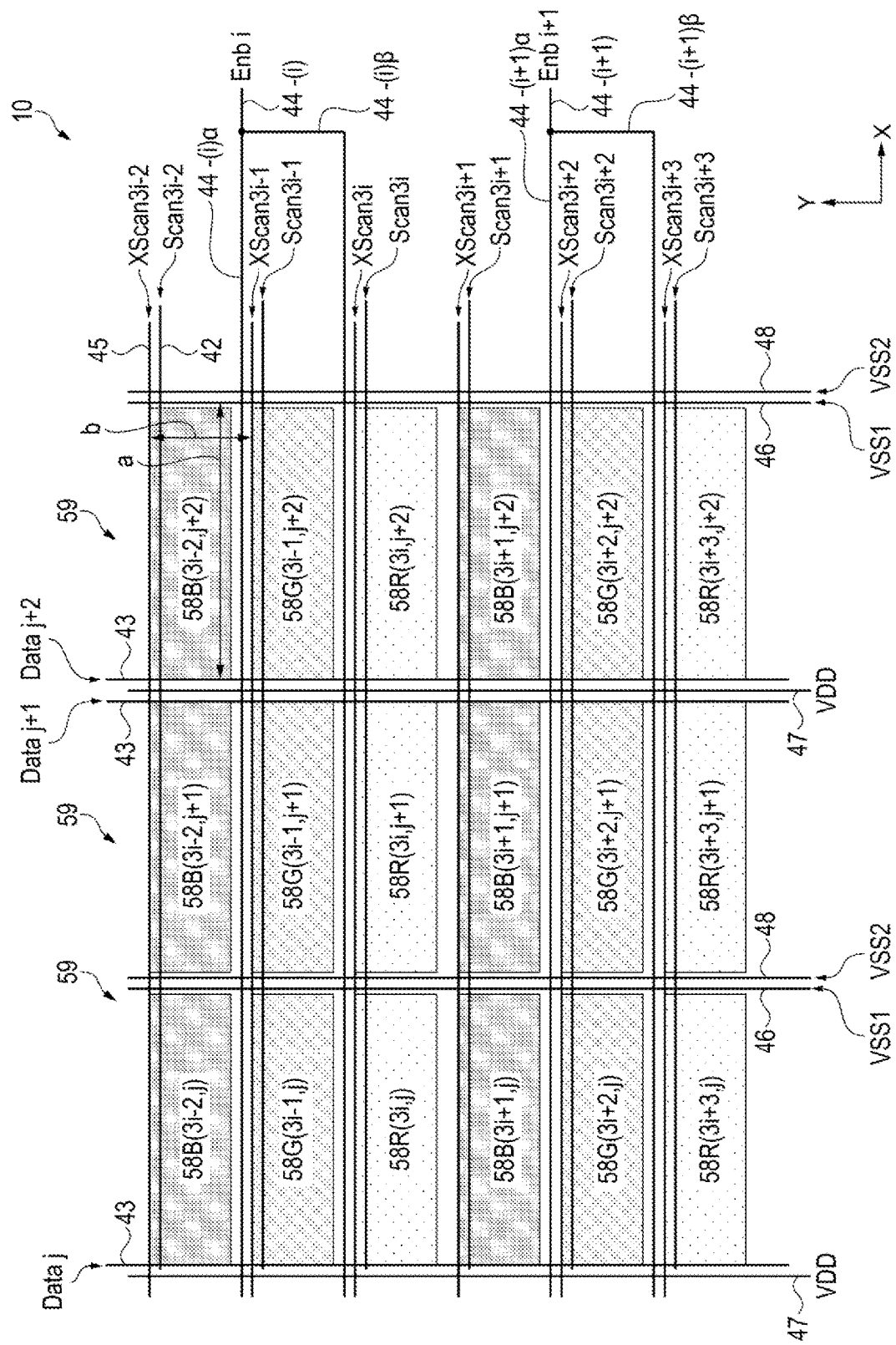
FIG. 6 is a diagram describing a configuration of a pixel.
Figure 12:
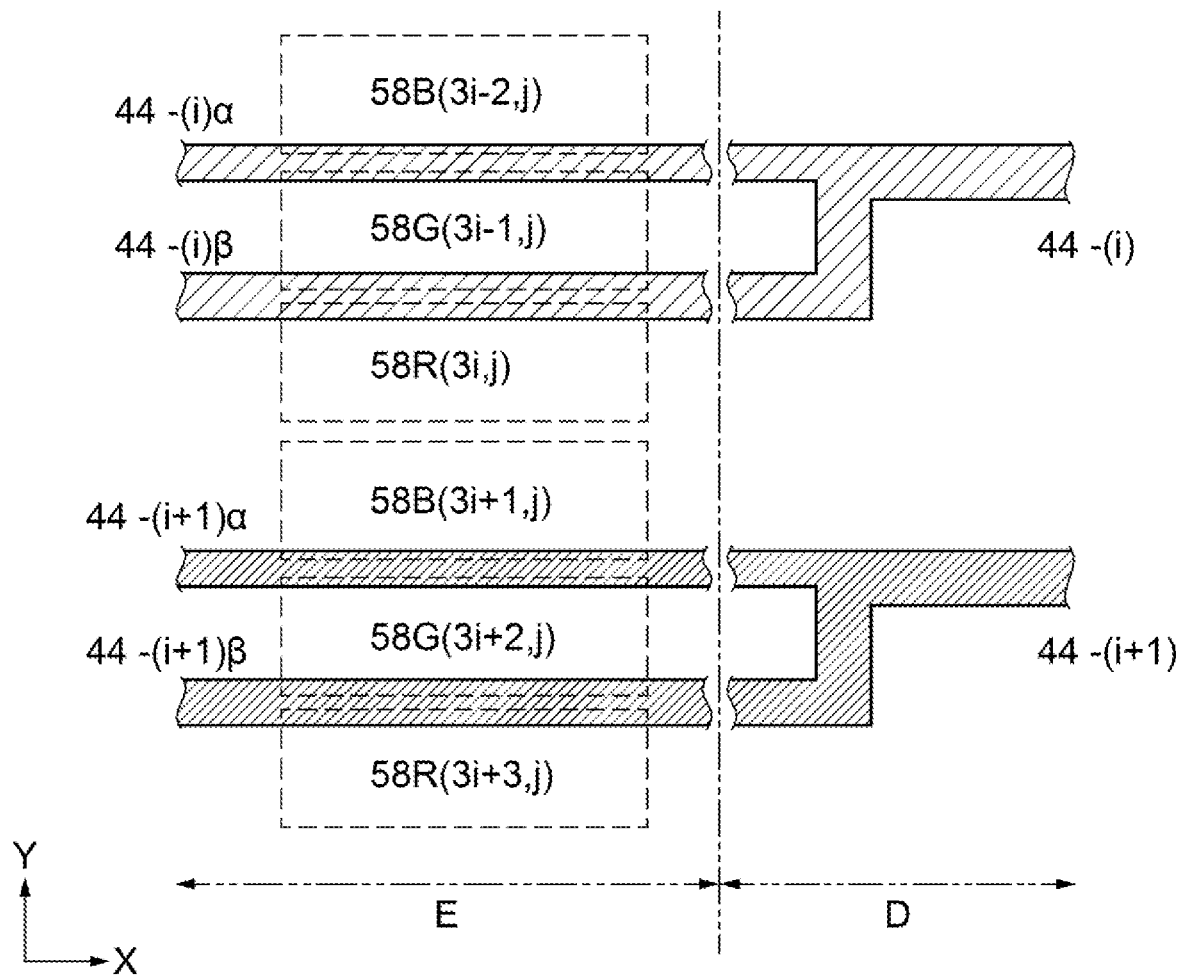
FIG. 12 is an enlarged diagram describing an enable wiring line of the electro-optical device.

A configuration of a pixel according to the present embodiment will now be described with reference to FIG. 6 and FIG. 12. FIG. 6 is a diagram describing the configuration of the pixel according to the present embodiment.

In the electro-optical device 10, a pixel 59 composed of three sub-pixels 58B, 58G, and 58R is a display unit. In the present embodiment, the length a in the X direction of the sub-pixel 58 is 12 micrometers (μm) and the length b in the Y direction of the sub-pixel 58 is 4 micrometers (μm).

As illustrated in FIG. 6, the pixel 59 (i, j) located at the i-th row and the j-th column in the matrix of the pixel units is configured to include, in the matrix of the sub-pixel units, the sub-pixel 58B (3i−2, j) located at the (3i−2)-th row and the j-th column, the sub-pixel 58G (3i−1, j) located at the (3i−1)-th row and the j-th column, and the sub-pixel 58R (3i, j) located at the 3i-th row and the j-th column. Here, i is an integer not less than 1 and not more than L (=M/p), and j is an integer not less than 1 and not more than N. The sub-pixel 58B (3i−2, j) located at the (3i−2)-th row and the j-th column is electrically connected with a first scan line 42 in the (3i−2)-th row, a second scan line 45 in the (3i−2)-th row, the enable line 44 in the i-th row, and the data line 43 in the j-th column. Similarly, the sub-pixel 58G (3i−1, j) located at the (3i−1)-th row and the j-th column is electrically connected with the first scan line 42 in the (3i−1)-th row, the second scan line 45 in the (3i−1)-th row, and the enable line 44 in the i-th row, and the data line 43 in the j-th column, and the sub-pixel 58R (3i, j) located at the 3i-th row and the j-th column is electrically connected with the first scan line 42 in the 3i-th row, the second scan line 45 in the 3i-th row, the enable line 44 in the i-th row, and the data line 43 in the j-th column. Further, the sub-pixel 58B (3i+1, j) located at the (3i+1)-th row and the j-th column is electrically connected with the first scan line 42 in the (3i+1)-th row, the second scan line 45 in the (3i+1)-th row, the enable line 44 in the (i+1)-th row, and the data line 43 in the j-th column. Further, the sub-pixel 58G (3i+2, j) located at the (3i+2)-th row and the j-th column is electrically connected with the first scan line 42 in the (3i+2)-th row, the second scan line 45 in the (3i+2)-th row, the enable line 44 in the (i+1)-th row, and the data line 43 in the j-th column, and the sub-pixel 58R (3i+3, j) located at the (3i+3)-th row and the j-th column is electrically connected with the first scan line 42 in the (3i+3)-th row, the second scan line 45 in the (3i+3)-th row, the enable line 44 in the (i+1)-th row, and the data line 43 in the j-th column.

Figure 9:
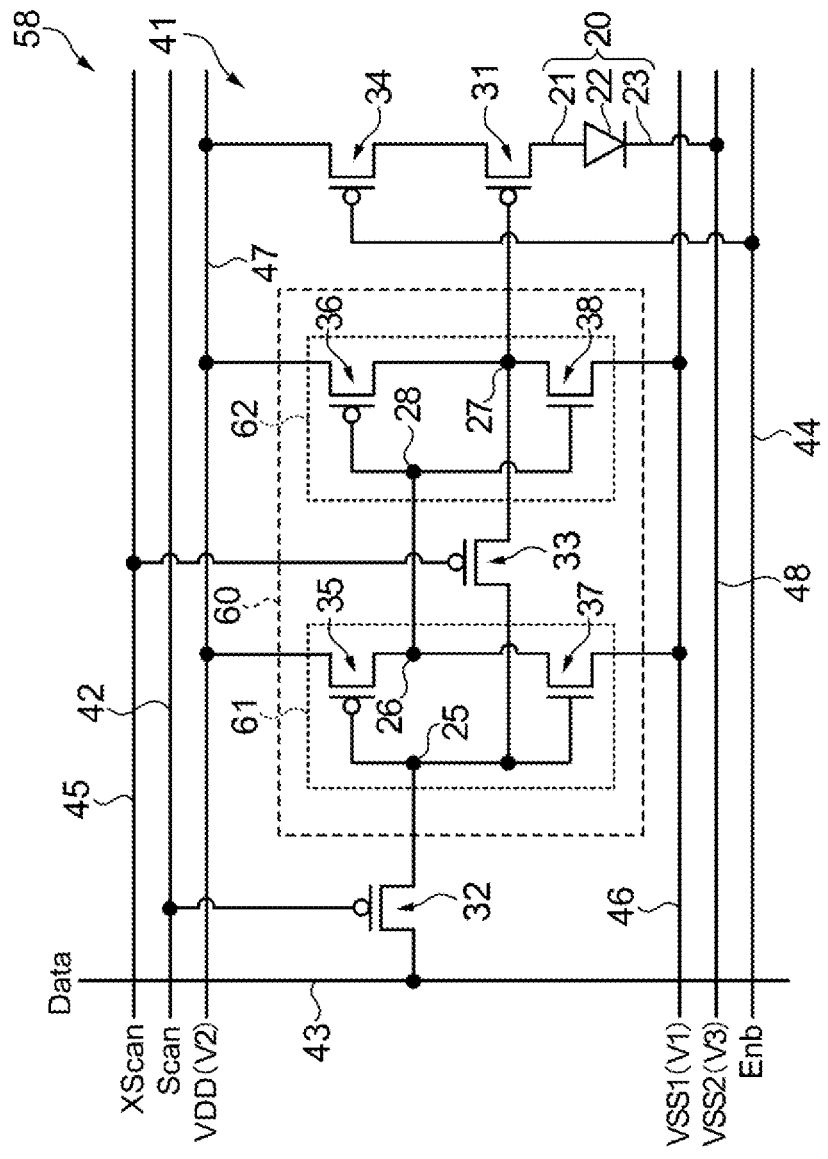
FIG. 9 is a diagram describing a configuration of a pixel circuit.

The sub-pixels 58 each include the pixel circuit 41 illustrated in FIG. 9. When the pixel circuit 41 included in the sub-pixel 58B (3i−2, j) located at the (3i−2)-th row and the j-th column is set to be a first pixel circuit, the pixel circuit 41 included in the sub-pixel 58G (3i−1, j) located at the (3i−1)-th row and the j-th column is set to be a second pixel circuit, the pixel circuit 41 included in the sub-pixel 58R (3i, j) located at the 3i-th row and the j-th column is set to be a fifth pixel circuit, the pixel circuit 41 included in the sub-pixel 58B (3i+1, j) located at the (3i+1)-th row and the j-th column is set to be a third pixel circuit, the pixel circuit 41 included in the sub-pixel 58G (3i+2, j) located at the (3i+2)-th row and the j-th column is set to be a fourth pixel circuit, and the pixel circuit 41 included in the sub-pixel 58R (3i+3, j) located at the (3i+3)-th row and the j-th column is set to be a sixth pixel circuit, a first enable line 44, that is, an enable line 44-(i) in the i-th row, is electrically connected to the first pixel circuit, the second pixel circuit, and the fifth pixel circuit, and a second enable line 44, that is, an enable line 44-(i+1) in the (i+1)-th row, is electrically connected to the third pixel circuit, the fourth pixel circuit, and the sixth pixel circuit. In short, the first scan line 42 and the second scan line 45 is a unique wiring line arranged for each of the rows of the matrix of the sub-pixel units, while the enable line 44 is a unique wiring line arranged for each of the rows of the matrix of the pixel units. In other words, with respect to the plurality of sub-pixels 58 that constitute one pixel 59, one type of the enable line 44 being unique to the pixel 59 is arranged. The plurality of the sub-pixels 58 that constitute one pixel 59 are electrically connected with the same enable line 44.

In the present embodiment, it is set such that r=p=3, and different enable lines 44 are arranged for each of the respective three sub-pixels 58. The enable line 44-(i) in the i-th row branches into the first branch line 44-($i$) α of the enable line and the second branch line 44-($i$) β of the enable line. The first branch line 44-($i$) α of the enable line is electrically connected to the sub-pixels 58 located in its own upper or lower row and supplies enable signals to these sub-pixels 58. In the present embodiment, the first branch line 44-($i$) α of the enable line is electrically connected to the sub-pixel 58 on the upper side of its own, that is, the sub-pixels 58B (3i−2, any given column) at the (3i−2)-th row and any given column, and supplies enable signals to these sub pixels 58. The first branch line 44-($i$) α of the enable line is wired between the sub-pixels 58B (3i−2, any given column) at the (3i−2)-th row and any given column and the sub-pixels 58G (3i−1, any given column) at the (3i−1)-th row and any given column. Accordingly, an enable signal is introduced from below into the sub-pixels 58B (3i−2, any given column) at the (3i−2)-th row and any given column.

The second branch line 44-($i$) β of the enable line, which branches from the enable line 44-($i$) in the i-th row, is electrically connected to the sub-pixels 58 located in the upper and lower rows of its own, that is, the sub-pixels 58G (3i−1, any given column) at the (3i−1)-th row and any given column and the sub-pixels 58R (3i, any given column) at the 3i-th row and any given column, and supplies enable signals to these sub-pixels 58. The second branch line 44-($i$) 3 of the enable line is wired between the sub-pixels 58G (3i−1, any given column) at the (3i−1)-th row and any given column and the sub-pixels 58R (3i, any given column) at the 3i3i-th row and any given column. The first branch line 44-($i$) α of the enable line and the second branch line 44-($i$) β of the enable line, which are branched from the enable line 44-($i$) in the same i-th row, naturally transmit the same enable signals. Further, in the sub-pixels 58G (3i−1, any given column) and the sub-pixels 58R (3i, any given column), layouts of wiring lines, elements, and the like within the sub-pixel 58 are substantially line-symmetrical with respect to the second branch line 44-($i$) β of the enable line.

By arranging the enable lines 44 as described above, compared to a case where three pieces of the enable lines 44 are arranged, with respect to three pieces of the sub-pixels 58 constituting the pixel 59, from the enable line driving circuit 54, the number of the enable lines 44 within the display region E can be reduced. Specifically, the sum total number of the first branch lines 44-($i$) α of the enable line and the second branch lines 44-($i$) β of the enable line can be reduced down to ⅔, with respect to a case where the enable line 44 is arranged for each of the sub-pixels 58. The decrease in the number of wiring lines improves the manufacturing yield, as well as suppresses a failure such as an inter-wiring short-circuit, thus providing an advantage of extending the product life.

The first branch line 44-($i$) α of the enable line supplies enable signals to the sub-pixels 58B (3i−2, any given column) at the (3i−2)-th row and any given column. On the other hand, the second branch line 44-($i$) β of the enable line supplies enable signals to the sub-pixels 58G (3i−1, any given column) at the (3i−1)-th row and any given column and the sub-pixels 58R (3i, any given column) at the 3i-th row and any given column. That is, the second branch line 44-($i$) β is electrically connected to the sub-pixels of doubled number of the first branch lines 44-($i$) α, and supplies enable signals. Thus, as illustrated in FIG. 12, by setting the thickness of the second branch line 44-($i$) β thicker than the first branch line 44-($i$) α, the second branch line 44-($i$) β can supply the enable signals in a stable manner. In other words, the first branch line 44-($i$) α can be set thinner than the second branch line 44-($i$) β.

Sharing one of the enable line 44 with the plurality of sub-pixels 58 causes the enable line driving circuit 54 to stably operate, concurrently providing an advantage of reducing the power consumption. In the present embodiment, an enable signal for controlling light emission is supplied for the respective pixels 59 in a single row, thus, compared to a case where an enable signal is supplied for each of the sub-pixel 58, the number of the enable lines 44 to be connected to the enable line driving circuit 54 can be reduced down to ⅓. As a result, the clock frequency for driving the enable line driving circuit 54 to be reduced down to ⅓, and the enable line driving circuit 54 is caused to stably operate due to the reduction of the clock frequency. Further, the reduction of the clock frequency also serves to reduce the power consumption of the enable line driving circuit 54.

Regarding the wiring line and layout, in the electro-optical device 10 of the present embodiment, the pixels 59 or the sub-pixels 58 in a column have a relationship of mirror-image inversion with the pixels 59 or the sub-pixels 58 in the column adjacent thereto. The pixels 59 or the sub-pixels 58 in a column are in a line-symmetric relationship with the pixels 59 or the sub-pixels 58 in the column adjacent thereto, with respect to the boundary that separates these sub-pixels 58 For example, the arrangement relationship of the respective elements in the sub-pixels 58 (any given row, j) in the j-th column is in a line-symmetric relationship with the arrangement relationship of the respective elements in the sub-pixels 58 (any given row, j+1) in the (j+1)-th column, with respect to the boundary that separates these sub-pixels 58. Further, the arrangement relationship of the respective elements in the sub-pixels 58 (any given row, j+1) in the (j+1)-th column is in a line-symmetric relationship with the arrangement relationship of the respective elements in the sub-pixels 58 (any given row, j+2) in the (j+2)-th column, with respect to the boundary that separates these sub-pixels 58. In this way, the sub-pixels 58 have a layout horizontally reversed every other column. In the sub-pixels 58 (any given row, j) in the j-th column, the sub-pixels 58 (any given row, j+2) in the (j+2)-th column, and the like, the data line 43 and the high potential line 47 are arranged at the left side of the sub pixels 58, while the first low potential line 46 and the second low potential line 48 are arranged at the right side of the sub-pixels 58. On the other hand, the sub-pixels 58 (any given row, j+1) in the (j+1)-th column and the sub-pixels 58 in two columns adjacent to the above sub-pixels 58, the data line 43 and the high potential line 47 are arranged at the right side of the sub-pixels 58, while the first low potential line 46 and the second low potential line 48 are arranged at the left side of the sub-pixels 58.

The first low potential line 46 and the second low potential line 48 are arranged in every two columns of the sub-pixels 58. The first low potential line 46 and the second low potential line 48 are arranged, for example, between the sub-pixels 58 (any given row, j) in the j-th column and the sub-pixels 58 (any given row, j+1) in the (j+1)-th column, or between the sub-pixels 58 (any given row, j+2) in the (j+2)-th column and the sub-pixels 58 (any given row, j+3) in the (j+3)-th column. The sub-pixels 58 (any given row, j) in the j-th column and the sub-pixels 58 (any given row, j+1) in the (j+1)-th column share the first low potential line 46 and the second low potential line 48 that are arranged in between. Similarly, the sub-pixels 58 (any given row, j+2) in the (j+2)-th column and the sub-pixels 58 (any given row, j+3) in the (j+3)-th column share the first low potential line 46 and the second low potential line 48 that are arranged in between.

The high potential line 47 and the data line 43 are both arranged in every two columns of the sub-pixels 58. Specifically, the high potential line 47 and the data line 43 are arranged, for example, between the sub-pixels 58 (any given row, j−1) in the (j−1)-th column and the sub-pixels 58 (any given row, j) in the j-th column, or between the sub-pixels 58 (any given row, j+1) in the j+1 column and the sub-pixels 58 (any given row, j+2) in the (j+2)-th column. The sub-pixels 58 (any given row, j−1) in the (j−1)-th column and the sub-pixels 58 (any given row, j) in the j-th column share the high potential line 47 arranged in between. Further, the data lines 43 are arranged, disposing the high potential line 47 in between, and the data line 43 arranged at the right side of the high potential line 47 supplies an image signal Data j to the sub-pixels 58 (any given row, j) in the j-th column. Similarly, the sub-pixels 58 (any given row, j+1) in the (j+1)-th column and the sub-pixels 58 (any given row, j+2) in the (j+2)-th column share the high potential line 47 arranged in between. Further, the data lines 43 are arranged so as to sandwich the high potential line 47, and the data line 43 arranged at the right side of the high potential line 47 supplies an image signal Data j+1 to the sub-pixels 58 (any given row, j+1) in the (j+1)-th column, while the data line 43 arranged at the right side supplies an image signal Data j+2 to the sub-pixels 58 (any given row, j+2) in the (j+2)-th column.

As such, the pixel layout including the first low potential line 46, the second low potential line 48, the high potential line 47, and the data line 43 has a bilateral symmetric relationship between the sub-pixels 58 in an odd number column and the sub-pixels 58 in an even number column. By arranging the first low potential line 46, the second low potential line 48, the high potential line 47, and the data line 43 as described above, compared to a case where the first low potential lines 46, the second low potential lines 48, and high potential lines 47 are arranged for each of the sub-pixels 58, the number of the first low potential lines 46, the second low potential lines 48, and the high potential lines 47 within the display region E can be reduced by half. The decrease in the number of wiring lines improves the manufacturing yield, as well as suppresses a failure such as an inter-wiring short-circuit, thus providing an advantage of extending the product life.

In the present embodiment, the first low potential line 46 and the second low potential line 48 are paired and these paired lines are arranged in every two columns of the sub-pixels 58. The first low potential line 46 and the second low potential line 48 being paired decreases the potential difference between the wiring lines, compared to the cases where the first low potential line 46 and the high potential line 47 are paired and the second low potential line 48 and the high potential line 47 are paired, thus reducing the possibility of short-circuit to provide an advantage of extending the product life.

Digital Driving in Electro-Optical Device

Figure 7:
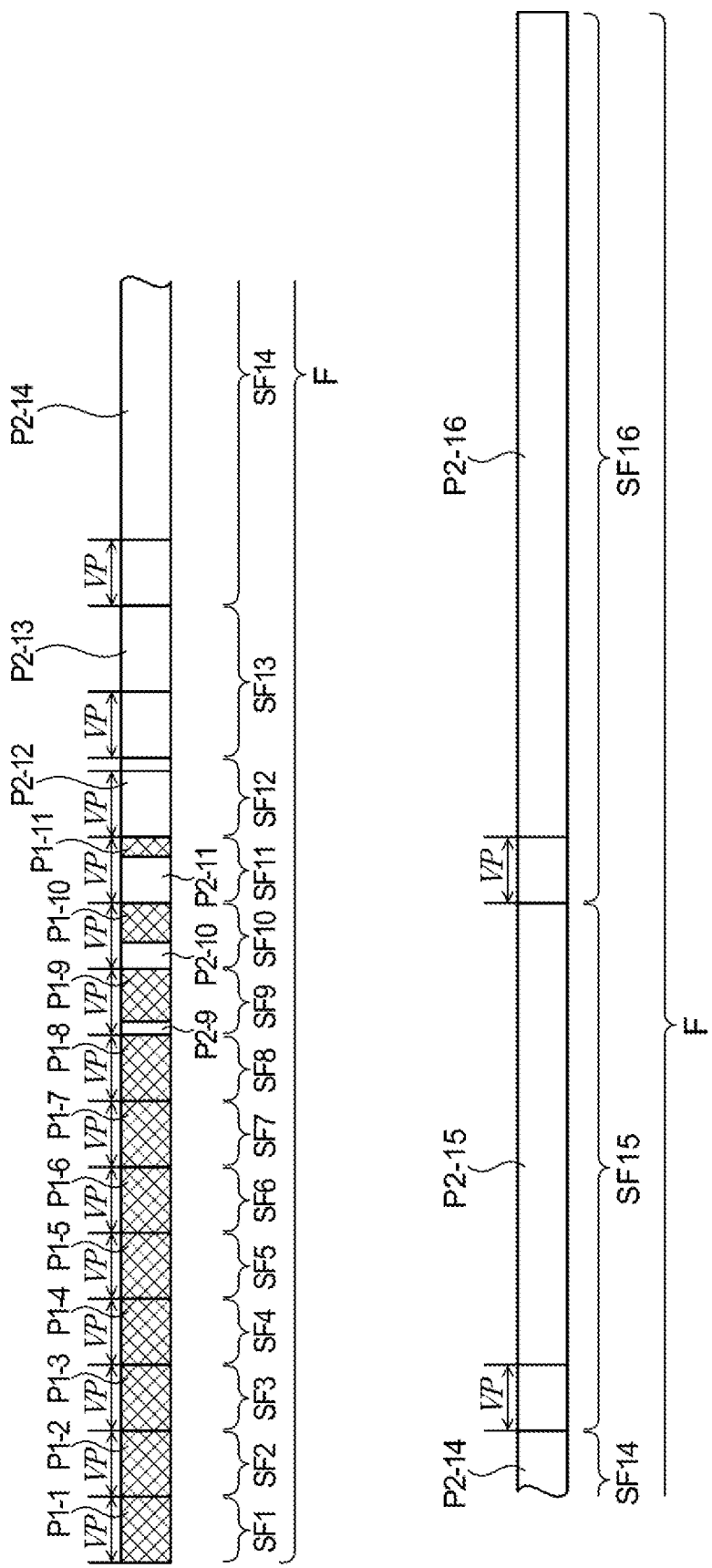
FIG. 7 is a diagram describing a digital driving of the electro-optical device.

A method for displaying an image by digital driving in the electro-optical device 10 according to the present embodiment will now be described with reference to FIG. 7 and FIG. 8. FIG. 7 is a diagram describing a digital driving in the electro-optical device according to the present embodiment. FIG. 8 is a table describing a time-division gray scale method of the electro-optical device according to the present embodiment.

The electro-optical device 10 displays an image in the display region E (see FIG. 4) by digital driving. That is, the light-emitting elements 20 arranged in the respective sub-pixels 58 is set into one of states of light emission and non-light emission, where the gray scale of an image to be displayed is determined by the ratio of the light emission period of each of the light-emitting elements 20 to the total light-emission enabled period. This is referred to as time-division driving.

FIG. 7 illustrates one frame period for displaying a single image. In the present embodiment, one frame period is equal to one field (F). As illustrated in FIG. 7, in a time-division driving, one field for displaying a single image is divided into a plurality of sub-fields (SF), and the light emission and the non-light emission of the light-emitting element 20 are controlled for each of the sub-fields (SF) to achieve a gray-scale display.

FIG. 8 illustrates a setting example of time-division driving in the present embodiment. Specifically, there are illustrated, in the upper row of FIG. 8, drive conditions such as a frame frequency f, a scan line selection period S, one vertical period VP, and the bit number g of gray scales. In the middle row of FIG. 8, there are illustrated, the time period of the respective sub-fields, that is, the sum of time of a non-display period P1 and a display period P2 at the right side, the time of the non-display period P1 of the respective sub-fields at the left side, and the time of the display period P2 in the respective sub-fields at the center. In the lower row of FIG. 8, the number of display gray scales and the total number of display colors are illustrated.

As illustrated in the upper row of FIG. 8, as an example, displaying an image by a progressive method with a frame frequency (f) of 60 Hz gives that one frame period (1/f)=one field=16.7 milliseconds (msec). Here, an example of the bit number g of gray scale is set to 16 and a display with $2^{16}$=65,536 gray scales is performed by 16-bit time-division gray scale method will be described. The 16-bit time-division gray scale method causes one field F to be divided into 16 sub-fields, which are SF1 to SF16.

When the i-th sub-field is denoted by SFi within one field F, the 16 sub-fields including the first sub-field SF1 to the 16th sub-field SF16 are illustrated in FIG. 7. Each of the sub-fields includes the display period P2 that is P2-1 to P2-16 as a second period, and the non-display period P1 that is P1-1 to P1-16 as a first period. Note that, in the present specification, SF1 to SF16 may be collectively referred to as sub-field without distinction, the non-display periods P1-1 to P1-16 may be collectively referred to as non-display period P1 without distinction, and the display periods P2-1 to P2-16 may be collectively referred to as display period P2 without distinction.

The non-display period P1 includes a scan line selection period S and a lights-out period. The scan line selection period S is a period in which one of the first scan line 42 is selected and an image signal is being written into a memory circuit 60 of the corresponding sub-pixel 58. Further, the lights-out period is a period in which the light-emitting element 20 is being set to non-light emission. The period in which all of the first scan lines 42 within the display region E have been completed to be selected is the vertical period. In the present embodiment, as illustrated in the upper row of FIG. 8, when the scan line selection period S is set to be 0.167 microseconds (μsec), one vertical period VP is set such that VP=0.167×10⁻³×2160=0.36 milliseconds.

When an image is displayed by 16-bit time-division gray scale method using a progressive method with a frame frequency of 60 Hz, P2-1 in sub-field 1 is set at 0.0002 milliseconds (=0.2 microseconds), as illustrated in the middle row of FIG. 8. The display period P2 in the subsequent sub-field SF is set to twice of the display period P2 in the one previous sub-field SF. In this way, the total light-emission enabled period during one frame period is the sum of P2-1 to P2-16, which is 13.116 milliseconds.

FIG. 7 illustrates the non-display period P1 and the display period P2 of the respective sub-fields. Note that in FIG. 7, compared to those of SF9 and the subsequent sub-fields, the display periods P2 of SF1 to SF8 are short, thus, the display periods P2-1 to P2-8 are not illustrated. In addition, compared to those of the previous sub-fields, the non-display periods P1 of SF12 and the subsequent sub-fields are short, thus, the non-display periods P1-12 to P1-16 are not illustrated.

The digital driving of the electro-optical device 10 by 16-bit time-division gray scale method displays 65,536 gray scales, based on the ratio of the light emission period to the total of the display periods P2 within one field F. For example, for black display of gray scale "0", the light-emitting element 20 is set to non-light emission during all of the display periods of SF1 to SF16. On the other hand, for white display of gray scale "65,535", the light-emitting element 20 is set to light emission during all of the display periods of SF1 to SF16. In addition, when displaying with an intermediate luminance of, for example, gray scale "7", the light-emitting element 20 is caused to emit light during the display period P2-1 of SF1, the display period P2-2 of SF2, and the display period P2-3 of SF3, while the light-emitting element 20 is set to non-light emission during the display periods of the other sub-fields. In this way, the light-emitting element 20 is selected as appropriate to be light emission or non-light emission during the display period P2 for each of the sub-fields constituting one field F, thus, an intermediate gray scale is displayed. This allows, as illustrated in the lower row of FIG. 8, the number of displayable colors, that is, the total number of display colors becomes 281,474,976,710,656.

In a typical organic EL device, which performs a gray-scale display by analog control of a current flowing through an organic EL element, variation in brightness and deviation in gray scale are occurred between pixels, due to variation in the driving transistors, thus, the display quality is lower. In addition, when a variation compensation circuit is provided, an increase in power consumption is caused due to a current flow also occurring in the compensation circuit. Moreover, in the typical organic EL device, it is necessary to enlarge a capacitive element for storing an analog signal to achieve multiple gray scales of display, resulting in a difficulty in attaining higher resolution, as well as an increase in power consumption in association with charge and discharge of the large capacitive element. In other words, the typical organic EL device has a difficulty in performing displaying of high-quality images with high-resolution and multiple gray scales at low-power consumption.

The electro-optical device 10 according to the present embodiment employs digital driving that operates based on binary values of ON/OFF, the light-emitting element 20 takes either one of binary states of light emission and non-light emission. Thus, the light-emitting element 20, compared to the case of analog driving, becomes less likely to be affected by variation in current-voltage characteristics and threshold voltage of a transistor, resulting in less variation in brightness and less deviation in gray scale in the sub-pixel 58. The pixels 59 also reduces color variation, to thus cause a high-quality image to be displayed. Moreover, a digital driving does not need to possess a large capacitive element, thus making it possible to achieve a finer sub-pixel 58 and pixel 59 and to facilitate the advancement of high-resolution. In addition, charging and discharging of a large capacitive element do not occur, thus the power consumption is reduced.

In the digital driving of the electro-optical device 10, by increase or decrease in the number of sub-pixels (the bit number g of gray scale), can facilitate increase or decrease in the number of gray scales. Further, the digital driving of the electro-optical device 10, in which the non-display period P1 is set to a signal writing period for writing an image signal into the memory circuit 60, can facilitate a conversion of 16-bit gray-scale display into, for example, 8-bit gray-scale display without changing the signal writing period, that is, without changing the clock frequency of the driving circuit 51. Moreover, the digital driving of the electro-optical device 10 causes the image signals in the memory circuit 60 of the sub-pixel 58, which change the display, to be rewritten between the sub-fields SF or between the fields F. On the other hand, the image signals in the memory circuit 60 of the sub-pixel 58, which do not change the display, are kept retained without being allowed to be rewritten. This results in an achievement of low-power consumption. As described above, the electro-optical device 10 according to the present embodiment displays images with multiple gray scales and high-resolution, where the energy consumption is small, and variation in brightness and deviation in gray scale between the sub-pixels 58 are small.

Configuration of Pixel Circuit

Next, a configuration of a pixel circuit according to the present embodiment will be described with reference to FIG. 9. FIG. 9 is a diagram describing the configuration of the pixel circuit according to the present embodiment.

As illustrated in FIG. 9, the pixel circuit 41 is provided for each sub-pixel 58 arranged corresponding to the intersection of the first scan line 42 and the data line 43. The second scan line 45 and the enable line 44 are arranged along the first scan line 42. The first scan line 42, the second scan line 45, the data line 43, and the enable line 44 correspond to respective pixel circuit 41, and signals are provided to the pixel circuit 41 from these wiring lines. In addition, to respective pixel circuit 41, the first potential (VSS1) is supplied from the first low potential line 46, the second potential (VDD) is supplied from the high potential line 47, and the third potential (VSS2) is supplied from the second low potential line 48.

The pixel circuit 41 includes a P-type first transistor 31, the P-type second transistor 32, the light-emitting element 20, the memory circuit 60, and a control circuit. The P-type fourth transistor 34 is the control circuit. Since the pixel circuit 41 includes the memory circuit 60 of a static memory type, the electro-optical device 10 can be driven digitally. Further, since the pixel circuit 41 includes the control circuit, accurate time-division driving of the electro-optical device can be achieved.

The light-emitting element 20, the first transistor 31, and the fourth transistor 34 are arranged in series between the second potential line (high potential line 47) and the third potential line (second low potential line 48). The memory circuit 60 is arranged between the first potential line (first low potential line 46) and the second potential line (high potential line 47). The second transistor 32 is arranged between the memory circuit 60 and the data line 43.

The memory circuit 60 includes a first inverter 61, a second inverter 62, and the P-type third transistor 33. The output terminal 26 of the first inverter 61 is electrically connected to the input terminal 28 of the second inverter 62.

The third transistor 33 is arranged between an output terminal 27 of the second inverter 62 and a first terminal 25 of the first inverter 61. Note that, hereinafter, the first terminal 25 of the first inverter 61 is abbreviated as a first input 25, the output terminal 26 of the first inverter 61 as a first output 26, the input terminal 28 of the second inverter 62 as a second input 28, and the output terminal 27 of the second inverter 62 as a second output 27.

Note that, in the present specification, a state in which a terminal A and a terminal B are electrically connected with each other refers to a state in which the logic of the terminal A and the logic of the terminal B can be identical to each other. For example, even when a transistor, a resistive element, a diode, and the like is arranged between the terminal A and the terminal B, it can be said that the terminals are electrically connected with each other when the logic of the terminal A and the logic of the terminal B are identical to each other. Further, in the description of the circuit diagram of FIG. 9 or the like, the "arranged" in "a transistor, a resistive element and/or the like is arranged between A and B" does not mean arranging in a lay-out, but rather means arranging in a circuit diagram. In addition, "a transistor, a resistance element, and/or the like is arranged in series between a terminal A and a terminal B" means that the arranging order of the transistors, resistance elements, and/ or the like between the terminal A and the terminal B may be changed.

A digital signal stored in the memory circuit 60 expressed by binary values of High or Low. In the present embodiment, the light-emitting element 20 is set to a light emission enabled state when the potential of the second output 27 is Low, and the light-emitting element 20 is set to a non-light emission state when the potential of the second output 27 is High. Since the memory circuit 60 is arranged between the first potential line (first low potential line 46) and the second potential line (high potential line 47), High corresponds to the second potential (VDD), and Low corresponds to the first potential (VSS1).

The first inverter 61 has a CMOS configuration including a P-type fifth transistor 35 and an N-type seventh transistor 37. The second inverter 62 has a CMOS configuration including a P-type sixth transistor 36 and an N-type eighth transistor 38. The first input 25 is the gate of the fifth transistor 35 and the seventh transistor 37, and is electrically connected with one of the source and the drain of the third transistor 33. The output terminal 26 is the drain of the fifth transistor 35 and the seventh transistor 37, and is electrically connected with the second input 28. The second output 27 is the drain of the sixth transistor 36 and the eighth transistor 38, and is electrically connected with the other of the source and the drain of the third transistor 33. The input terminal 28 is the gate of the sixth transistor 36 and the eighth transistor 38, and is electrically connected with the first output 26.

Note that, both the first inverter 61 and the second inverter 62 have a CMOS configuration in the present embodiment, the inverters 61 and 62 may be composed of a transistor and a resistor. For example, one of the fifth transistor 35 and the seventh transistor 37 may be replaced with a resistance element in the first inverter 61, or one of the sixth transistor 36 and the eighth transistor 38 may be replaced with a resistance element in the second inverter 62.

The light-emitting element 20 is an organic EL element in the present embodiment, and includes an anode 21 that is a pixel electrode, a light-emitting unit 22 that is a light emission functional layer, and a cathode 23 that is a counter electrode. The light-emitting element 20, the first transistor 31, and the control circuit are arranged in series between the second potential line and the third potential line. The first transistor 31 is a driving transistor for the light-emitting element 20, and the gate of the first transistor 31 is electrically connected with the second output 27. When the first transistor 31 is set into the ON-state, the light-emitting element 20 can emit light. The fourth transistor 34 constituting the control circuit is a control transistor that controls light emission of the light-emitting element 20, and the gate of the fourth transistor 34 is electrically connected with the enable line 44. When an activation signal is supplied to the enable line 44 and the fourth transistor 34 is set into the ON-state, the light-emitting element 20 can emit light.

The P-type transistor is arranged on the higher potential side than the light-emitting element 20. By arranging the P-type first transistor 31 and the P-type fourth transistor 34 in this manner with respect to the light-emitting element 20, the first transistor 31 and the P-type fourth transistor 34 can be linearly operated. Note that, in the present specification, the operation of the transistor in the linear region is simply referred to as linear operation. When the first transistor 31 and the fourth transistor 34 perform linear operation, the majority of the potential difference between the second potential (VDD) and the third potential (VSS2) is applied to the light-emitting element 20, thus, the variation in both transistors hardly affects the emission luminance of the light-emitting element 20.

The second transistor 32 is a selection transistor for the pixel circuit 41, and the second transistor 32 is arranged between the memory circuit 60 and the data line 43. One of the source and the drain of the P-type second transistor 32 is electrically connected with the data line 43, and the other is electrically connected with the first input 25. The gate of the second transistor 32 is electrically connected with the first scan line 42. When a selection signal is applied to the first scan line 42 and the second transistor 32 is set into the ON-state, the data line 43 and the first input 25 are set into a conductive state, and an image signal is written to the memory circuit 60 from the data line 43. When a non-selection signal is applied to the first scan line 42 and the second transistor 32 is set into the OFF-state, the data line 43 and the memory circuit 60 are set into a non-conductive state.

The third transistor 33 is arranged between the first input 25 and the second output 27. One of the source and the drain of the third transistor 33 is electrically connected with the first input 25, and the other is electrically connected with the second output 27. The gate of the third transistor 33 is electrically connected with the second scan line 45. When a retention signal is applied to the second scan line 45 and the third transistor 33 is set into the ON-state, the second output 27 and the first input 25 are set into a conductive state, and the image signal written to the memory circuit 60 is retained.

Next, a method for writing an image signal to the memory circuit 60 by controlling the second transistor 32, the third transistor 33, and the fourth transistor 34, and a method for switching the light-emitting element 20 between light emission and non-light emission are described. In the present embodiment, the first scan line 42, the second scan line 45, and the enable line 44 are independent of each other with respect to respective pixel circuit 41, and thus the second transistor 32, the third transistor 33, and the fourth transistor 34 operate independently of each other. The second transistor 32 and the third transistor 33 operate substantially complementary to each other. As a result, the transistors can be set such that the third transistor 33 is not in the ON-state when the second transistor 32 sets into the ON-state. Further, the fourth transistor 34 can always be set to the OFF-state when the second transistor 32 sets into the ON-state.

When an image signal is written to the memory circuit 60, the fourth transistor 34 is set into the OFF-state with a non-activation signal. When the second transistor 32 is set into the ON-state with a selection signal, an image signal is supplied to the memory circuit 60. The image signal is written from the data line 43 to the first inverter 61 and its inversion signal is written from the first inverter 61 to the second inverter 62.

With the non-retention signal of the second scan signal, the third transistor 33 is already in the OFF-state when the second transistor 32 changes from the OFF-state to the ON-state, or the third transistor 33 changes from the ON-state to the OFF-state when the second transistor 32 changes from the OFF-state to the ON-state. In this manner, when the second transistor 32 is set into the ON-state, the third transistor 33 is not in the ON-state, and the second output 27 and the first input 25 are electrically isolated from each other.

Here, the following assumes that a virtual circuit is provided in which the third transistor 33 is not present and the second output 27 and the first input 25 are always connected with each other. Consider a situation in which the first input 25 of the virtual circuit is rewritten from Low to High. Since the first input 25 is Low before the High is supplied, the second input 28 is High and the eighth transistor 38 is in the ON-state. Thus, in the virtual circuit, when the second transistor 32 sets into the ON-state, and the High is supplied from the data line 43, a path extending from the High of the data line 43 to the Low of the first low potential line 46 via the second transistor 32 and the eighth transistor 38 is formed. Consequently, rewriting the potential of the first input 25 from High to Low may take a long time, or, at worst, may not be performed. Likewise, this virtual circuit may cause a failure in which rewriting the first input 25 from High to Low takes a long time or cannot be performed.

In contrast, in the present embodiment, when the second transistor 32 is set to the ON-state and an image signal is rewritten in the memory circuit 60, the third transistor 33 is not in the ON-state, and accordingly the first input 25 and the second output 27 are electrically isolated from each other, and thus, the failure caused by the above-mentioned virtual circuit is not caused. Further, when the second transistor 32 is in the ON-state, the fourth transistor 34 is set to the OFF-state, and thus the light-emitting element 20 does not emit light while an image signal is being written to the memory circuit 60. In this manner, it is possible to avoid a situation in which the light-emitting element 20 imperfectly emits light during a writing period of an image signal and shifts the gray scale. In other words, an accurate gray scale can be presented even when the display period P2-1 of the SF1 is set as a very short period.

When the second transistor 32 is switched from the ON-state to the OFF-state with a non-selection signal, writing of an image signal to the memory circuit 60 is stopped. The third transistor 33 is already in the ON-state when the second transistor 32 changes from the ON-state to the OFF-state, or the third transistor 33 changes from the OFF-state to the ON-state when the second transistor 32 changes from the ON-state to the OFF-state. As a result, the second output 27 and the first input 25 are electrically connected to each other, and the image signal written to the memory circuit 60 is maintained between the first inverter 61 and the second inverter 62. Since the retention signal is supplied to the second scan line 45 until the non-retention signal of the next subfield is input, the image signal retained in the memory circuit 60 is stably retained without being erroneously rewritten. In a period in which an image signal is rewritten to the memory circuit 60, the fourth transistor 34 is in the OFF-state and the light-emitting element 20 does not emit light.

Subsequently, when causing the light-emitting element 20 to emit light, the fourth transistor 34 is set into the ON-state with an activation signal while the second transistor 32 is set to the OFF-state and the third transistor 33 is set to the ON-state. At this time, when the first transistor 31 is in the ON-state with the image signal retained in the memory circuit 60, a current flows through a path extending from the second potential line (high potential line 47) to the third potential line (second low potential line 48) via the fourth transistor 34, the first transistor 31 and the light-emitting element 20, and the light-emitting element 20 emits light. The second transistor 32 is in the OFF-state and the third transistor 33 is in the ON-state in a period in which the fourth transistor 34 is in the ON-state and the light-emitting element 20 is capable of emitting light. As a result, the image signal retained in the memory circuit 60 is stably retained. In other words, a high-quality image with no erroneous display is displayed.

Relationship Between Each Potential and Threshold Voltage of Transistor

As described above, in the present embodiment, the low-voltage power-supply is configured with the first potential (first low potential VSS1) and the second potential (high potential VDD), and the high-voltage power-supply is configured with the third potential (second low potential VSS2) and the second potential (high potential VDD). With this configuration, the electro-optical device 10 that operates at a high speed and provides bright state is achieved. This point will be described below.

In the following description, the first potential is denoted as V1, the second potential is denoted as V2, and the third potential is denoted as V3. In the present embodiment, the voltage of the low-voltage power-supply is smaller than the voltage of the high-voltage power-supply, and V2−V1<V2−V3 holds. As an example, the first potential is set to V1=4.0V, the second potential is set to V2=7.0V, and the third potential is set to V3=0V. At this time, the voltage of the low-voltage power-supply is V2−V1=3.0V, and the voltage of the high-voltage power-supply is V2−V3=7.0V.

When the potentials are set in the above-described manner, the driving circuit 51 and the memory circuit 60 are operated with the low voltage power supply, and thus the transistors included in the driving circuit 51 and the memory circuit 60 can be miniaturized and operated at a high speed. On the other hand, the light-emitting element 20 is caused to emit light with the high voltage power supply, and thus the emission luminance of the light-emitting element 20 can be increased. That is, be the configuration of the present embodiment, it can be achieved that each of the circuits to operate at a high speed and the electro-optical device 10 in which the light-emitting element 20 emits light at high intensity to provide bright state.

Typically, a light-emitting element such as an organic EL element requires a relatively high voltage higher than or equal to e.g., 5V to emit light. When the supply voltage is increased in a semiconductor device, however, the gate length L and/or the gate width W of the transistor has to be increased in order to prevent operational failures, and consequently the operation of the circuit becomes slow. On the other hand, decreasing the supply voltage in order to operate circuits at high speeds leads to a decrease in light emitting intensity of the light-emitting element. In short, in a typical configuration in which the supply voltage used for emission of the light-emitting element and the supply voltage used to operate circuits are identical, it is difficult to achieve both light emission at high luminance of the light-emitting element and high-speed operation of the circuits.

In contrast, the present embodiment has a low-voltage power-supply and a high-voltage power-supply as the power supplies for the electro-optical device 10, and the low-voltage power-supply is set to be the power supply for the operation of the driving circuit 51 and the memory circuit 60. In this manner, the size of each of the transistors constituting the driving circuit 51 and/or the memory circuit 60 is set to about L=0.5 micrometers (μm) so as to be smaller than about L=0.75 micrometers (μm) of the first transistor 31 and/or the fourth transistor 34, and these circuits are driven at a low voltage of V1−V2=3.0V. Thus, the driving circuit 51 and/or the memory circuit 60 can be operated at a high speed.

Then, the high-voltage power-supply causes the light-emitting element 20 to emit light at a high voltage of V2−V3=7.0V, and thus it is possible to cause the light-emitting element 20 to emit light at high luminance. Further, as described later, by linearly operating the first transistor 31 and/or the fourth transistor 34 arranged in series with the light-emitting element 20, the majority of the high voltage of V2−V3=7.0V can be applied to the light-emitting element 20, and the emission luminance of the light-emitting element 20 can be further increased.

Since the first transistor 31, which is the driving transistor, is P-type, the threshold voltage ($V_{th1}$) of the first transistor 31 is set to negative ($V_{th1}$<0). When the image signal retained in the memory circuit 60 corresponds to non-light emission, the potential of the output terminal 27 of the memory circuit 60 is High (second potential). While the gate potential of the first transistor 31 is the second potential (V2), the source potential of the first transistor 31 is lower than the second potential (V2) by the potential drop in the fourth transistor 34. As a result, the gate-source voltage $V_{gs1}$ of the first transistor 31 is greater than the 0V by the potential drop in the fourth transistor 34.

In this manner, the gate-source voltage $V_{gs1}$ is greater than 0 and greater than the threshold voltage $V_{th1}$, and accordingly the P-type first transistor 31 is set to the OFF-state. In an exemplary case of $V_{th1}$=−0.36V, when the gate-source voltage $V_{gs1}$ is about 0V, the gate-source voltage $V_{gs1}$ is greater than the threshold voltage $V_{th1}$, and accordingly the first transistor 31 is set to the OFF-state. Thus, the first transistor 31 can be reliably set to the OFF-state when the image signal is non-light emission.

When the image signal retained in the memory circuit 60 corresponds to light-emission, the potential of the output terminal 27 of the memory circuit 60 is Low (first potential). While the gate potential of the first transistor 31 is the first potential (V1), the source potential of the first transistor 31 is near the second potential as described later, and thus the gate-source voltage $V_{gs1}$ of the first transistor 31 can be approximated by the potential difference of the first potential (V1) with respect to the second potential (V2). Specifically, $V_{gs1}$=V1−V2=4.0V−7.0V=−3.0V. In this manner, since the gate-source voltage $V_{gs1}$ of the first transistor 31 is sufficiently smaller than the threshold voltage $V_{th1}$, the first transistor 31 is set into the ON-state. Thus, the first transistor 31 can be reliably set into the ON-state when the image signal corresponds to light-emission.

Since the fourth transistor 34, which is the control transistor, is P-type, the enable signal (activation signal) in the active state has a low potential, and the enable signal (non-activation signal) in the non-active state has a high potential. Specifically, the non-activation signal is set to a high potential equal to or greater than the second potential (V2), and, in the present embodiment, is set to the second potential (V2). In addition, preferably, the potential of the activation signal is low as much as possible and is equal to or lower than V2−(V2−V1), and, in the present embodiment, is the second low potential (V3).

In the present embodiment, since the second transistor 32 is P-type, the non-selection signal is set to a high potential equal to or greater than the second potential (V2), and is set to the second potential (V2). In addition, the potential of the selection signal is low as much as possible and is equal to or lower than the first potential (V1), and is the third potential (V3).

In the present embodiment, since the third transistor 33 is P-type, the non-retention signal is set to a high potential equal to or greater than the second potential (V2), and is set to the second potential (V2). In addition, the potential of the retention signal is set low as much as possible and is equal to or lower than the first potential (V1), and may be set to the third potential (V3).

From the above results, the relationships between the threshold voltage ($V_{th1}$) of the first transistor 31 and the potentials (V1, V2, V3) that are preferable in the present embodiment are expressed by Equation 1 and Equation 2.

[Mathematical Equation 1]

$$0 > V\text{th}1 \qquad (1)$$

[Mathematical Equation 2]

$$V3 < V1 < V2 + V\text{th}1 \qquad (2)$$

Feature of Transistor

Next, a feature of the transistor included in the electro-optical device 10 according to the present embodiment will be described. In the electro-optical device 10 according to the present embodiment, the first transistor 31 and the fourth transistor 34 are arranged in series with the light-emitting element 20 between the second potential line (high potential line 47) and the third potential line (second low potential line 48) constituting the high-voltage power-supply. The On-resistance of the first transistor 31 may be sufficiently lower than the On-resistance of the light-emitting element 20. In addition, the On-resistance of the fourth transistor 34 may be sufficiently lower than the On-resistance of the light-emitting element 20.

The "sufficiently low" means a driving condition for linearly operating the first transistor 31 and/or the fourth transistor 34, and specifically, the On-resistance of the first transistor 31 and/or the fourth transistor 34 is 1/100 or less, and may be 1/1000 or less, of the On-resistance of the light-emitting element 20. With such a configuration, the first transistor 31 and/or the fourth transistor 34 can be linearly operated when the light-emitting element 20 emits light.

As a result, majority of a potential drop caused in the first transistor 31, the fourth transistor 34, and the light-emitting element 20 arranged in series, that is, a potential difference between the second potential and the third potential, which are the voltages of the high-voltage power-supply, is applied to the light-emitting element 20, and thus, it becomes difficult to be affected by variations in the threshold voltage of both transistors 31 and 34 on light-emission of the light-emitting element 20. In other words, with such a configuration, the influence of variations in the threshold voltage of the first transistor 31 and/or the fourth transistor 34 can be reduced, thus, variations in brightness and shifts in gray scale between the pixels 59 (sub-pixels 58) can be reduced, image display with excellent uniformity can be achieved.

This is because, by setting the On-resistance of the first transistor 31 and/or the fourth transistor 34 to 1/100 or less of the On-resistance of the light-emitting element 20, the light-emitting element 20 receives 99% or more of the power supply voltage, and the potential drop in both transistors 31 and 34 becomes 1% or less. Since the potential drop in both transistors 31 and 34 is 1% or less, the influence of the variations in the threshold voltage of both transistors 31 and 34 on the light emission property of the light-emitting element 20 is small.

In the present embodiment, the series resistance of the first transistor 31 and the fourth transistor 34 is about 1/1000 of the On-resistance of the light-emitting element 20. In this case, the light-emitting element 20 receives about 99.9% of the power supply voltage, and the potential drop in both transistors 31 and 34 is about 0.1%, and thus the influence of the variation in the threshold voltage of both transistors 31 and 34 on the light emission property of the light-emitting element 20 can be almost neglected.

The On-resistance of the transistor depends on the polarity of the transistor, the gate length, the gate width, the threshold voltage, the gate insulating film thickness, and the like. In the present embodiment, preferably, the polarity, gate length, gate width, threshold voltage, gate insulating film thickness, and the like of both transistors 31 and 34 are set such that the On-resistance of the first transistor 31 and the fourth transistor 34 is sufficiently lower than the On-resistance of the light-emitting element 20. This point is described below.

In the present embodiment, an organic EL element is used for the light-emitting element 20, and the transistors such as the first transistor 31 and the fourth transistor 34 are formed on the first substrate 11, which is a single crystal silicon substrate. The voltage current property of the light-emitting element 20 is generally expressed by the following Equation 3.

[Mathematical Equation 3]

$$I_{EL} = L_{EL} W_{EL} J_0 \left\{ \exp\left(\frac{V_{EL} - V_0}{V_{tm}}\right) - 1 \right\} \quad (3)$$

In Equation 3, $I_{EL}$ is the current passing through the light-emitting element 20, $V_{EL}$ is the voltage applied to the light-emitting element 20, $L_{EL}$ is the length of the light-emitting element 20 in plan view, $W_{EL}$ is the width of the light-emitting element 20 in plan view, $J_0$ is the current density coefficient of the light-emitting element 20, $V_{tm}$ is the temperature dependent coefficient voltage included in the light-emitting element 20, and $V_0$ is the threshold voltage for light-emission of the light-emitting element 20. Here, $V_{tm}$, which is the temperature dependent coefficient voltage of the light-emitting element 20, is constant at a constant temperature.

Note that when the voltage of the high-voltage power-supply is represented by $V_P$ and the potential drop generated by the first transistor 31 and the fourth transistor 34 is represented by $V_{ds}$, $V_{EL}+V_{ds}=V_P$. In addition, in the present embodiment, it is set to be that $L_{EL}$=11 micrometers (μm), $W_{EL}$=3 micrometers (μm), $J_0$=1.449 milliampere per squared centimeters (mA/cm$^2$), $V_0$=3.0 volts (V), and $V_{tm}$=0.541 volts (V).

On the other hand, when the first transistor 31, the fourth transistor 34, and/or the like is expressed as an i-th transistor (i is 1 or 4), its drain current $I_{dsi}$ is expressed by the following Equation 4.

[Mathematical Equation 4]

$$I_{dsi} = \frac{W_i}{L_i} \cdot \frac{\varepsilon_0 \varepsilon_{0x}}{t_{0xi}} \cdot \mu_i (V_{gsi} - V_{thi}) V_{dsi} \equiv Z_i (V_{gsi} - V_{thi}) V_{dsi} \quad (4)$$

In Equation 4, $W_i$ is the gate width of the i-th transistor, $L_i$ is the gate length of the i-th transistor, $\varepsilon_0$ is the dielectric constant of vacuum, $\varepsilon_{0x}$ is the dielectric constant of the gate insulating film, $t_{0xi}$ is the thickness of the gate insulating film, and $\mu_i$ is the mobility of the i-th transistor, $V_{gsi}$ is the gate voltage, $V_{dsi}$ is the drain voltage at the potential drop by the i-th transistor, and $V_{thi}$ is the threshold voltage of the i-th transistor.

In Example 1, it is set to be that $W_1$=1.25 micrometers (μm), $W_4$=1.25 micrometers (μm), $L_1$=$L_4$=0.75 micrometers (μm), $t_{ox}$=20 nanometers (nm), $\mu_1$=$\mu_4$=150 square centimeters per second (cm$^2$/V·s), $V_{th1}$=$V_{th4}$=−0.36V, $V_{gs1}$=V1−V2=−3.0V, and $V_{gs4}$=V3−V2=−7.0V.

Note that when the first transistor 31 and the fourth transistor 34 are linearly operated, the voltage current property of the light-emitting element 20 is approximated by the following Equation 5 near $V_{ds}$=0V with use of the potential drop $V_{ds}$ at both transistors 31 and 34.

[Mathematical Equation 5]

$$I_{EL} = -kV_{ds} + I_0 \quad (5)$$

In Example 1, the coefficient k defined by Equation 5 is k=−1.39×10$^{-6}$ (Ω$^{-1}$). $I_0$ is the amount of current of the case where all of the voltage $V_P$ of the high-voltage power-supply is applied to the light-emitting element 20, and $I_0$=7.82×10$^{-7}$ (A).

Under the above-mentioned conditions, the voltage emitted by the light-emitting element 20 is a voltage that is $I_{EL}$=$I_{ds}$ from Equation 3 and Equation 5. In this embodiment, the results were $V_P$=V3−V2=−7.0V, $V_{ds1}$=−0.0068V, $V_{ds4}$=−0.0027V, $V_{EL}$=6.9905V, and $I_{EL}$=$I_{ds1}$=$Ids4_{ds4}$=7.651×10$^{-7}$ A. In addition, the On-resistance of the first transistor 31 was 8.780×10$^3$Ω, the On-resistance of the fourth transistor 34 was 3.491×10$^3$Ω, and the On-resistance of the light-emitting element 20 was 9.136×10$^6$Ω.

Accordingly, the On-resistance of the first transistor 31 was about 1/1040, which is lower than 1/1000 of the On-resistance of the light-emitting element 20, and the On-resistance of the fourth transistor 34 was about 1/2600, which is lower than 1/1000 of the On-resistance of the light-emitting element 20, and thus, application of the majority of the voltage of the high-voltage power-supply to the light-emitting element 20 was achieved.

Under this condition, even if the threshold voltage of the transistor varies by 30% or more, $V_{EL}$=6.99V and $I_{EL}$=$I_{ds1}$=$I_{ds4}$=7.67×10$^{-7}$ A are constant. In other words, in Example 1, $V_{EL}$=6.99V and $I_{EL}$=$I_{ds1}$=$I_{ds4}$=7.67×10$^{-7}$ A are constant even if the $V_{th1}$ and/or $V_{th4}$ varies between 0.29V and 0.53V. Normally, such a large variation of the threshold voltage of the transistor does not occur. Therefore, by setting the On-resistance of the fourth transistor 34 to about 1/1000 or less of the On-resistance of the light-emitting element 20, variation in the threshold voltage in the first transistor 31 and the fourth transistor 34 does not substantially affect the emission luminance of the light-emitting element 20.

Approximately, by setting $I_{EL}=I_{dsi}$ with simultaneous equations of Equation 4 and Equation 5, the influence of variations in the threshold voltage of the i-th transistor on the current $I_{EL}=I_{dsi}$ can be expressed by the following Equation 6.

[Mathematical Equation 6]

$$\left(1+\frac{k}{Z_i(V_{gsi}-V_{thi})}\right)I_{EL}=I_0 \qquad (6)$$

Since the $I_0$ is the amount of current of the case where all of the voltage $V_P$ of the high-voltage power-supply is applied to the light-emitting element 20, the light-emitting element 20 can be caused to emit light near the power supply voltage $V_P$ by increasing the absolute value of the gate voltage $V_{gsi}$ and $Z_i$ as shown in Equation 6. In other words, the greater $Z_i$, the smaller the influence of variations in the threshold voltage of the transistor on the light emission luminance of the light-emitting element 20.

In Example 1, since $k/Z_1=-3.22\times10^{-2}$V, $k/Z_4=-3.22\times10^{-2}$V, and since the absolute value thereof are small values, the left side second term of Equation 6 is less than about 0.01 (1%), with $k/(Z1 (V_{gs1}-V_{th1}))=0.01$ for the first transistor 31, and $k/(Z4 (V_{gs4}-V_{th4}))=0.005$ for the fourth transistor 34. As a result, the current (emission luminance) at the time of light emission of the light-emitting element 20 is not substantially affected by the threshold voltage of both transistors 31 and 34. In other words, by setting the value of $k/(Z_i (V_{gs1}-V_{thi}))$ to a value less than about 0.01 (1%), variations in the threshold voltages ($V_{th1}$ and $V_{th4}$) of both transistors 31 and 34 with respect to the luminance of the light-emitting element 20 can be substantially eliminated. Note that in Equation 6, k and $Z_i$ are defined by Equation 4 and Equation 5.

In order to cause the light-emitting element 20 to emit light near the power supply voltage $V_P$, it may set the absolute value of the gate voltage $V_{gsi}$ as large as possible. In the present embodiment (Example 1), by setting the potential of the enable signal (activation signal) in the active state to the third potential (V3) of the fourth transistor 34, the absolute value of the gate-source voltage $V_{gs4}$ of the fourth transistor 34 is increased.

In the present example, the gate width $W_1$ of the first transistor 31 arranged in series with the light-emitting element 20 is greater than the gate width $W_3$ of the third transistor 33 included in the memory circuit 60. As an example, $W_1=1.25$ micrometers (μm), and $W_3=0.75$ micrometers (μm). Thus, when the first transistor 31 is set into the ON-state and the light-emitting element 20 emits light, a large current can be passed through the light-emitting element 20, thus, the light emission luminance of the light-emitting element 20 can be increased. In addition, since the On-resistance of the first transistor 31 in the ON-state is reduced, variation in luminance caused by variation in the threshold voltage of the first transistor 31 can be reduced when the light-emitting element 20 emits light. On the other hand, the third transistor 33 has a function of maintaining a small potential difference between the second output 27 and the first input 25 while the light-emitting element 20 emits light. Therefore, it is not necessary that a large current flows through the third transistor 33, and the function is sufficiently exhibited even when the gate width $W_3$ of the third transistor 33 is smaller than the gate width $W_1$ of the first transistor 31. In this manner, the memory circuit 60 stably holds the image signal, and a display of high-resolution and high-grade images can be achieved.

In the present example, the gate length $L_1$ of the first transistor 31 is longer than the gate length $L_3$ of the third transistor 33. As an example, $L_1=0.75$ micrometers (μm) and $L_3=0.5$ micrometers (μm). Thus, a voltage higher than that of the memory circuit 60 including the third transistor 33 can be applied to the light-emitting element 20 arranged in series with the first transistor 31. In addition, even if a high voltage is applied to the light-emitting element 20 and/or the first transistor 31, the risk of destroying the first transistor 31 at a high voltage can be reduced since the gate length $L_1$ of the first transistor 31 is long. On the other hand, since the gate length $L_3$ of the third transistor 33 included in the memory circuit 60 is shorter than the gate length $L_1$ of the first transistor 31, the memory circuit 60 can be miniaturized by making the third transistor 33 smaller than the first transistor 31. As a result, the memory circuit 60 can be operated at a high speed and the light-emitting element 20 can be caused to emit light at a high voltage.

In the electro-optical device 10 according to the present embodiment, the fifth transistor 35 and the seventh transistor 37 constituting the first inverter 61 and the sixth transistor 36 and the eighth transistor 38 constituting the second inverter 62, which are included in the memory circuit 60, are arranged between the first potential line (first low potential line 46) and the second potential line (high potential line 47) constituting the low-voltage power-supply. Since the application voltage of the transistors 35, 36, 37 and 38 that operate in the low-voltage power-supply is lower than that of the first transistor 31 and/or the fourth transistor 34 that operate in the high-voltage power-supply, the gate length can be shortened and accordingly the gate width can be narrowed, and as a result, the area of the channel forming region can be reduced. In other words, the memory circuit 60 can be made finer. When the area of the channel forming region of the fifth transistors 35, 36, 37 and 38 is small, the transistor capacity is small, and therefore charging and discharging can be performed at a high speed. In other words, the writing and rewriting of the image signal to the memory circuit 60 can be performed at higher speed.

In the present embodiment, in plan view, the gate lengths of the fifth transistor 35, the sixth transistor 36, the seventh transistor 37, and the eighth transistor 38 included in the memory circuit 60 are shorter than the gate lengths of the first transistor 31 and the fourth transistor 34 arranged in series with the light-emitting element 20.

The gate lengths of the fifth transistor 35, the sixth transistor 36, the seventh transistor 37, and the eighth transistor 38 in plan view are $L_5=L_6=L_7=L_8=0.5$ micrometers (μm). As described above, since the gate lengths of the first transistor 31 and the fourth transistor 34 in plan view are $L_1=L_4=0.75$ micrometers (μm), the gate lengths of the fifth transistor 35, the sixth transistor 36, the seventh transistor 37, and the eighth transistor 38 are shorter.

In addition, in the present embodiment, in plan view, the areas of the channel forming region of the fifth transistor 35, the sixth transistor 36, the seventh transistor 37, and the eighth transistor 38 are smaller than the areas of the channel forming region of the first transistor 31 and the fourth transistor 34. The area of the channel forming region of the transistor is substantially equal to the area of the gate electrode that is oppositely arranged, that is, the product of the gate length and the gate width in plan view.

The gate widths of the N-type seventh transistor 37 and the eighth transistor 38 are $W_7=W_8=0.5$ micrometers (μm), and the gate widths of the P-type fifth transistor 35 and the sixth transistor 36 are $W_5=W_6=0.75$ micrometers (μm). Thus, the areas of the channel forming regions of the seventh transistor 37 and the eighth transistor 38 are 0.5×0.5=0.25 square micrometers (μm²), and the areas of the channel forming regions of the fifth transistor 35 and the sixth transistor 36 are 0.5×0.75=0.375 square micrometers (μm²). On the other hand, since the gate width of the first transistor 31 is $W_1=1.25$ micrometers (μm), the area of the channel forming region of the first transistor 31 is 0.75×1.25=0.9375 square micrometers (μm²). Since the gate width of the fourth transistor 34 is $W_4=1.25$ micrometers (μm), the area of the channel forming region of the fourth transistor 34 is 0.75×1.25=0.9375 square micrometers (μm²). Accordingly, the areas of the channel forming regions of the fifth transistor 35, the sixth transistor 36, the seventh transistor 37, and the eighth transistor 38 are smaller.

Thus, in the present embodiment, by setting the areas of the channel forming regions of the fifth transistors 35, 36, 37 and 38 included in the memory circuit 60 to areas smaller than the areas of the channel forming regions of transistors 31 and 34 arranged in series with the light-emitting element 20, the memory circuit 60 can be miniaturized and operated at a high speed, and the light-emitting element 20 can emit light at high luminance.

Driving Method of Pixel Circuit

Figure 10:
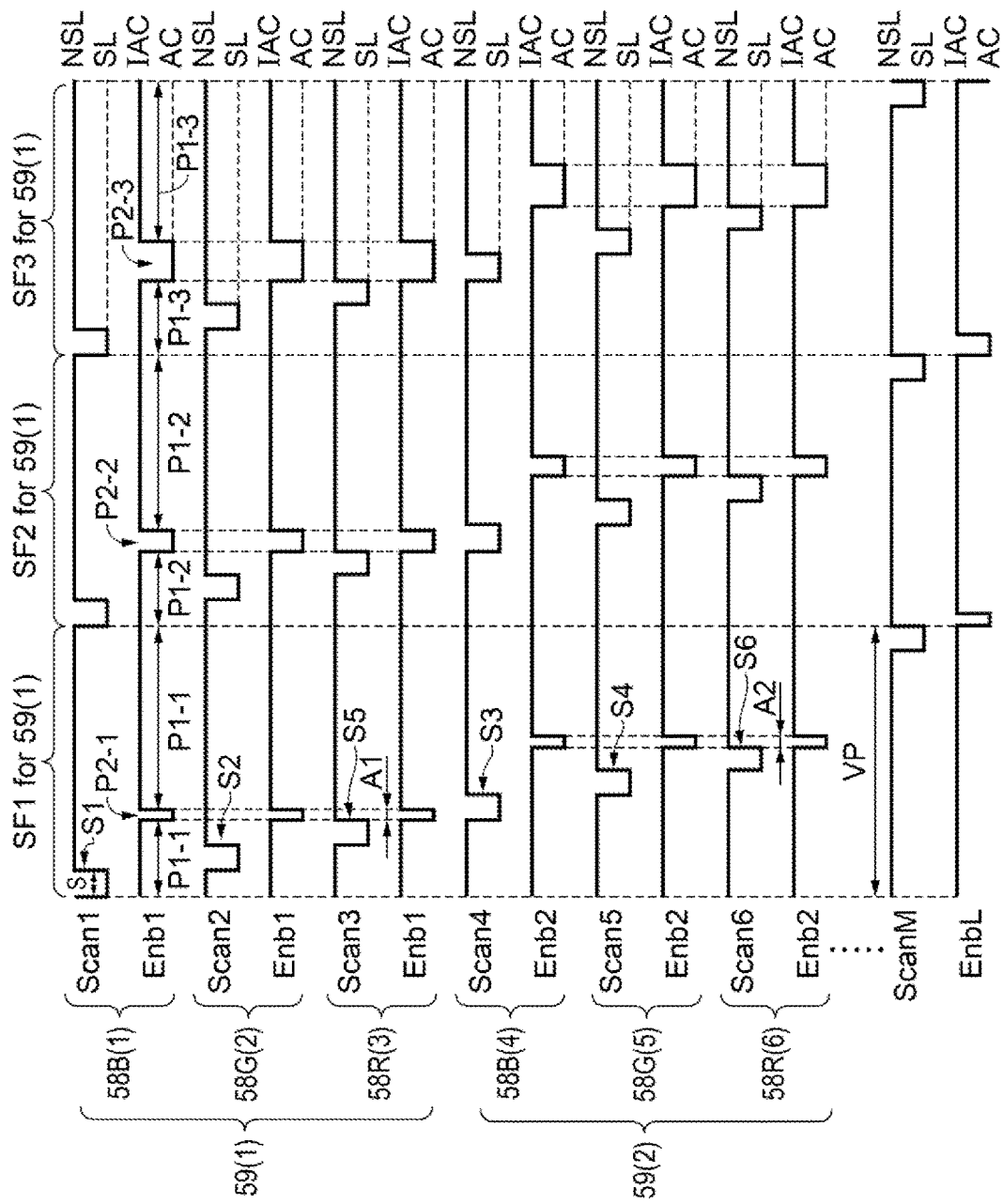
FIG. 10 is a diagram describing a driving method of the pixel circuit.

Next, a driving method of the pixel circuit in the electro-optical device according to the present embodiment will be described with reference to FIG. 10. FIG. 10 is a diagram for describing the driving method of the pixel circuit according to the present embodiment.

In FIG. 10, the horizontal axis is a time axis, and, of sixteen subfields, SF1 to SF16, for pixels of a first row in a matrix of pixel units, a period from a subfield SF1 to a subfield SF3 for the pixels of the first row are illustrated. In the vertical axis in FIG. 10, Scan1 to ScanM represent scan signals supplied to the first scan lines 42 of the first row to the M-th row in a matrix of sub-pixel units. The scan signal includes a scan signal for a selected state (selection signal SL) and a scan signal for a non-selected state (non-selection signal NSL). Enb1 to EnbL indicate enable signals supplied to the enable line 44 of the 1st row to the L-th row in the matrix of pixel units. The enable signal includes an enable signal (activation signal AC) for an active state and an enable signal (non-activation signal IAC) for an inactive state.

As described with reference to FIG. 7, one field (F) is divided into a plurality of subfields, and each of the subfields includes a non-display period P1 and a display period P2. The non-display period P1 is a period other than the display period in the subfield period, and is a period of turning off the light-emitting element 20. A scan line selection period S is a period of writing a signal to the sub-pixel 58 that connects to the first scan line 42 for one row, and is provided in the non-display period P1. An image signal is written to the memory circuit 60 of the pixel circuit 41 located in the row of the selected first scan line 42 in the scan line selection period S. The scan line selection period is also referred to as a selection period.

The display period P2 starts after the entire selection period S of the sub-pixel 58 constituting one pixel 59 has completed. In the present embodiment, after the selection period S in a sub-pixel 58B (3i−2, any given column) at the (3i−2)-th row and any given column, the selection period S in a sub-pixel 58G (3i−1, any given column) at the (3i−1)-th row and any given column, and the selection period S in a sub-pixel 58R (3i, any given column) at the 3i-th row and any given column have completed, an activation signal AC is supplied to an i-th enable line 44-(i) in the matrix of pixel units and the display period P2 for an i-th pixel 59(i) in the matrix of pixel units is provided. For example, as illustrated in FIG. 10, in the pixel 59(1) of the first row in the matrix of pixel units, the selection period (second selection period S2) for the sub-pixel 58G(2) is provided after the selection period (first selection period S1) for the sub-pixel 58B(1) of the first row in a matrix of sub-pixel units, and thereafter, a selection period (fifth selection period S5) for the third sub-pixel 58R(3) is provided. After the selection period for the third sub-pixel 58R(3) has completed, the activation signal AC is supplied to the pixel 59(1) of the first row, and the display period P2 is provided to the pixel 59(1) of the first row. The display period P2 is a period in which the light-emitting element 20 is capable of emitting light. The light-emitting element 20 is in a non-light emission state until the display period P2 starts after the display period P2 has completed. Since the activation signal AC is supplied to the enable line in the display period P2, the display period P2 is also an active period.

Likewise, thereafter, in synchronization with the start of the display period P2 for of the pixel 59(i) of the i-th row, the selection period S for the pixel 59(i+1) of the (i+1)-th row starts. In other words, after the selection period S in the sub-pixel 58R (3i, any given column) at the 3i-th row and any given column has completed, the selection period S in the sub-pixel 58B (3i+1, any given column) at the (3i+1)-th row and any given column starts. After the selection period S in the sub-pixel 58B (3i+1, any given column) at the (3i+1)-th row and any given column, the selection period S in the sub-pixel 58G (3i+2, any given column) at the (3i+2)-th row any given column, and the selection period S in the sub-pixel 58R (3i+3, any given column) at the (3i+3)-th row and any given column have completed, the activation signal AC is supplied to the enable line 44-(i+1) of the (i+1)-th row in the matrix of pixel units and the display period P2 for the pixel 59(i+1) of the (i+1)-th row in the matrix of pixel units is provided. For example, as illustrated in FIG. 10, when the selection period for the sub-pixel 58R(3) of the third row (fifth selection period S5) has completed, the selection period (third selection period S3) for the sub-pixel 58B(4) of the fourth row in the matrix of sub-pixel units starts in the pixel 59(2) of the second row in the matrix of pixel units. After the third selection period S3 has completed, a selection period (fourth selection period S4) for the sub-pixel 58G(5) of the fifth row is provided, and thereafter a selection period (sixth selection period S6) for the sub-pixel 58R(6) of the sixth row is provided. After the selection period for the sub-pixel 58R(6) of the sixth row has completed, the activation signal AC is supplied to the pixel 59(2) of the second row, and the display period P2 is provided at the pixel 59(2) of the second row.

Note that, as illustrated in FIG. 10, in the electro-optical device 10 according to the present embodiment, the non-activation signal IAC is supplied to the enable line 44 in the non-display period P1, and the activation signal AC is supplied to the enable line 44 in the display period P2. Since the potential of the non-activation signal IAC is High and the fourth transistor 34 is P-type, the fourth transistor 34 is set to the OFF-state, and the light-emitting element 20 is set to the non-emission state in the non-display period P1. Conversely, since the potential of the activation signal AC is Low, the fourth transistor 34 is set to the ON-state, and the light-emitting element 20 is set to the light emission enabled state in the display period P1.

During the selection period in the non-display period P1, a selection signal SL is supplied to the first scan line 42 that is electrically connected with that pixel circuit 41. This state is referred to as a state where the first scan line 42 is in the selected state. Since the potential of the selection signal SL is Low and the second transistor 32 of the pixel circuit 41 is P-type, the second transistor 32 is set to the ON-state. This state is referred to as a state where the pixel circuit 41 has been selected. In the selected pixel circuit 41, the data line 43 and the memory circuit 60 are set to the conductive state, and an image signal is written to the memory circuit 60 via the data line 43 and the second transistor 32. In this manner, the image signal is written to the memory circuit 60 in respective pixel circuit 41 during the selection period. In one subfield, the period other than the selection period is the non-selection period. During the non-selection period, a non-selection signal NSL is supplied to the first scan line 42 that is electrically connected with that pixel circuit 41. Since the potential of the non-select signal NSL is High, the data line 43 and the memory circuit 60 are set to the non-conductive state in the pixel circuit 41 to which the non-selection signal NSL is supplied, and the second transistor 32 electrically blocks the data line 43 and the memory circuit 60 to prevent the memory circuit 60 from being rewritten. In this manner, the memory circuit 60 maintains the image signal during the non-selection period. Note that M scan lines 42 are sequentially set to the selected state, and the period in which all of the scan lines 42 is selected is one vertical period $V_P$.

A specific driving method will now be described with reference to FIG. 10. In the present embodiment, after the first selection period S1 in which the selection signal is supplied to the first pixel circuit has completed, the second selection period S2 in which the selection signal is supplied to the second pixel circuit is provided. Further, after the second selection period S2 has completed, the fifth selection period S5 in which the selection signal is supplied to the fifth pixel circuit is provided. The first pixel circuit, the second pixel circuit, and the fifth pixel circuit constitute the same pixel 59, and are sequentially arranged in the row direction in the matrix of sub-pixel units. For example, the first pixel circuit is included in the sub-pixel 58B(3i−2) located in the (3i−2)-th row in the matrix of sub-pixel units, the second pixel circuit is included in the sub-pixel 58G(3i−1) of the (3i−1)-th row in the matrix of sub-pixel units, and the fifth pixel circuit is included in the sub-pixel 58R(3i) of the 3i-th row in the matrix of sub-pixel units. Accordingly, in this example, the first pixel circuit, the second pixel circuit, and the fifth pixel circuit are circuits that constitute the pixel 59(i) located in the i-th row in the matrix of pixel units. Note that FIG. 10 illustrates an exemplary case where i=1.

The first pixel circuit, the second pixel circuit, and the fifth pixel circuit are electrically connected with a first enable line 44. In the previous example, in the matrix of pixel units, the sub-pixel 58B(3i−2) located in the (3i−2)-th row, the sub-pixel 58G(3i−1) of the (3i−1)-th row and the sub-pixel 58R(3i) of the 3i-th row are electrically connected with an i-th enable line 44-(i), which corresponds to the first enable line 44. The first active period in which the activation signal AC is supplied to the first enable line 44 is provided after the first selection period S1, the second selection period S2, and the fifth selection period S5. Specifically, a selection period (second selection period S2) of a Scan(3i−1) starts in synchronization with the completion of a selection period (first selection period S1) of a Scan(3i−2), a selection period (fifth selection period S5) of a Scan(3i) starts in synchronization with the completion of the selection period of the Scan(3i−1), and supply of the activation signal AC to the enable line 44-(i) of the i-th row starts in synchronization with the completion of the selection period of the Scan(3i). That is, the first active period is provided after the fifth selection period after the second selection period. In this manner, after the image signal is introduced to the first pixel circuit, the second pixel circuit, and the fifth pixel circuit, the light-emitting elements 20 included in the pixel circuits 41 can be simultaneously set to the light emission enabled state. That is, the light emission enabled state is set for each pixel 59.

While the first active period is provided after the first selection period, the second selection period, and the fifth selection period, the first active period may start within one vertical period from the start time of the first selection period. This is because, in this manner, the light-emitting elements corresponding to the first pixel circuit, the second pixel circuit, and the fifth pixel circuit can be simultaneously set to the light emission enabled state at a suitable time after the introduction of the image signal, without the need for waiting for the completion of introduction of the image signal to all pixel circuits 41 in the display region E after introducing the image signal to the pixels 59 of one row in pixel matrix units, i.e., the first pixel circuit, the second pixel circuit, and the fifth pixel circuit. Desirably, immediately after the image signal is supplied to the pixels 59 of one row, the pixels 59 are set to the display period P2.

In the present embodiment, after the completion of the fifth selection period S5 in which the selection signal is supplied to the fifth pixel circuit, and further after the completion of the third selection period S3 in which the selection signal is supplied to the third pixel circuit, the fourth selection period S4 in which the selection signal is supplied to the fourth pixel circuit is provided. Further, after the completion of the fourth selection period S4, the sixth selection period S6 in which the selection signal is provided to the sixth pixel circuit is provided. The third pixel circuit, the fourth pixel circuit, and the sixth pixel circuit constitute the same pixel 59, and are sequentially arranged in the row direction in the matrix of sub-pixel units. For example, the third pixel circuit is included in the sub-pixel 58B(3i+1) located in the (3i+1)-th row in the matrix of sub-pixel units, the fourth pixel circuit is included in the sub-pixel 58G(3i+2) of the (3i+2)-th row in the matrix of sub-pixel units, and the sixth pixel circuit is included in the sub-pixel 58R(3i+3) of the (3i+3)-th row in the matrix of sub-pixel units. Accordingly, in this example, the third pixel circuit, the fourth pixel circuit, and the sixth pixel circuit are circuits that constitute the pixel 59(i+1) located in the (i+1)-th row in the matrix of pixel units.

The third pixel circuit, the fourth pixel circuit, and the sixth pixel circuit are electrically connected with a second enable line 44. In the previous example, in the matrix of pixel units, the sub-pixel 58B(3i+1) located in the (3i+1)-th row, the sub-pixel 58G(3i+2) of the (3i+2)-th row and the sub-pixel 58R(3i+3) of the (3i+3)-th row are electrically connected with an i-th enable line 44-(i+1), which corresponds to the second enable line 44. A second active period in which the activation signal AC is supplied to the second enable line 44 is provided after the third selection period S3, the fourth selection period S4, and the sixth selection period S6. Specifically, a selection period (fourth selection period S4) of a Scan(3i+2) starts in synchronization with the completion of a selection period (third selection period S3)

of a Scan(3i+1), a selection period (sixth selection period S6) of a Scan(3i+3) starts in synchronization with the completion of a selection period (fourth selection period S4) of the Scan(3i+2), and supply of the activation signal AC to the enable line 44-(i+1) of the (i+1)-th row starts in synchronization with the completion of the selection period (sixth selection period S6) of the Scan(3i+3). That is, the second active period is provided after the sixth selection period after the fourth selection period. In this manner, after the image signal is introduced to the third pixel circuit, the fourth pixel circuit, and the sixth pixel circuit, the light-emitting elements 20 included in the pixel circuits 41 can be simultaneously set to the light emission enabled state.

Note that the light-emitting element included in the first pixel circuit and the light-emitting element included in the third pixel circuit display a first color, the light-emitting element included in the second pixel circuit and the light-emitting element included in the fourth pixel circuit display a second color, and the light-emitting element included in the fifth pixel circuit and the light-emitting element included in the sixth pixel circuit display a third color. Thus, the light emission enabled state of the light-emitting element 20 can be controlled for each pixel 59 capable of performing color display.

In this manner, each time the first scan lines 42 are sequentially selected and the selection of the plurality of first scan lines 42 has completed, the activation signal AC is supplied to the enable line 44 corresponding to the first scan line 42. For example, in the present embodiment, after the first scan lines 42 of p rows are selected, the activation signal AC is supplied to the enable line 44 corresponding to the first scan lines 42 of p rows. Since the activation signal AC is supplied to the enable line 44 each time the selection of the first scan lines 42 sequentially proceeds and the selection of the plurality of rows of the first scan lines 42 has completed, the activation period of one pixel 59 and the selection period of the pixel 59 of the next row may overlap. In the example of FIG. 10, an overlap period presents between the first active period A1 and the third selection period S3. This is because the first scan line 42 and the enable line 44 are independent of each other in the pixel circuit 41 of the present embodiment. As a result, an image signal can be introduced into the pixel circuit 41 constituting the pixel 59 of the next row in a period in which the light-emitting element 20 of one row of the pixel circuit 41 in the matrix of pixel units is in the light emission enabled state. For example, the memory circuit 60 of the third pixel circuit may rewrite the image signal while the first pixel circuit, the second pixel circuit, and the fifth pixel circuit are set to the display period P2.

As illustrated in FIG. 10, in the present embodiment, the start time of supply of the activation signal AC to the first enable line (the start time of the first active period A1) and the start time of supply of the activation signal AC to the second enable line (the start time of the second active period A2) differ from each other. Specifically, the start time of the first active period A1 and the start time of the second active period A2 are offset by p times the scan line selection period. Thus, the period in which the light-emitting element corresponding to the first enable line is set to the light emission enabled state and the period in which the light-emitting element corresponding to the second enable line is set to the light emission enabled state can be shifted from each other. In other words, the light emission enabled state can be collectively set in units of p rows of the matrix of sub-pixel units. In the present example, since p=3, the light emission enabled state can be collectively set in units of three rows of the matrix of sub-pixel units, and the pixel 59 can be set to the light emission enabled state for each row of the matrix of pixel units. In addition, the time difference between the start time of supply of the activation signal AC to the first enable line and the start time of supply of the activation signal AC to the second enable line is shorter than the one vertical period VP. As a result, after the light-emitting element corresponding to the first enable line is set to the light emission enabled state, the light-emitting element corresponding to the second enable line can be set to the light emission enabled state at a suitable time after a required minimum time (r times the scan line selection period in the present example) has elapsed. As a result, the non-display period P1 can be set as a short period, and thus a high-quality and bright image is displayed.

As described above, in the present embodiment, the first pixel circuit, the second pixel circuit, the third pixel circuit, and the fourth pixel circuit are arranged along the second direction, and the enable line extends in the first direction. As a result, sub-pixels arranged in the second direction can be grouped in a single group for each of a plurality of rows, and thus the light emission enabled state of the group of light-emitting elements can be controlled with a simple configuration. Further, rather than arranging p enable lines 44 extending in the first direction from enable line driving circuit 54 for p respective sub-pixels 58 arranged in the second direction, a single enable line 44-(i) is arranged from the enable line driving circuit 54 for the pixel 59(i) of the i-th row and the enable line 44-(i) are branched into a first branch line 44-(i)α and a second branch line 44-(i)β. This makes it possible to reduce the number of the enable lines 44.

Digital driving provided with no non-display period P1 requires very complicated driving to make the light emission period shorter than one vertical period VP. In contrast, in the present embodiment, the non-display period P1 and the display period P2 are set with the enable line 44 being shared among pixel circuits 41 of a plurality of rows, and thus, even when there is a subfield where light emission period is shorter than one vertical period, the electro-optical device 10 can be readily driven by simply shortening the second period.

As described above, according to the first embodiment, the electro-optical device 10 that brightly displays high quality images with high resolution and multiple grey scales at low power consumption, and an electronic apparatus provided with the electro-optical device 10 can be achieved. In addition, since the plurality of pixel circuits 41 are simultaneously set to the light emission enabled state, the light from the light-emitting elements 20 corresponding to these pixel circuits 41 can be mixed and emitted simultaneously. In addition, since a single enable line 44 is arranged for a plurality of the sub-pixels 58, the number of the enable lines 44 can be reduced and the frequency for switching the enable signal can be reduced.

Second Embodiment

Configuration of Pixel

Figure 11:
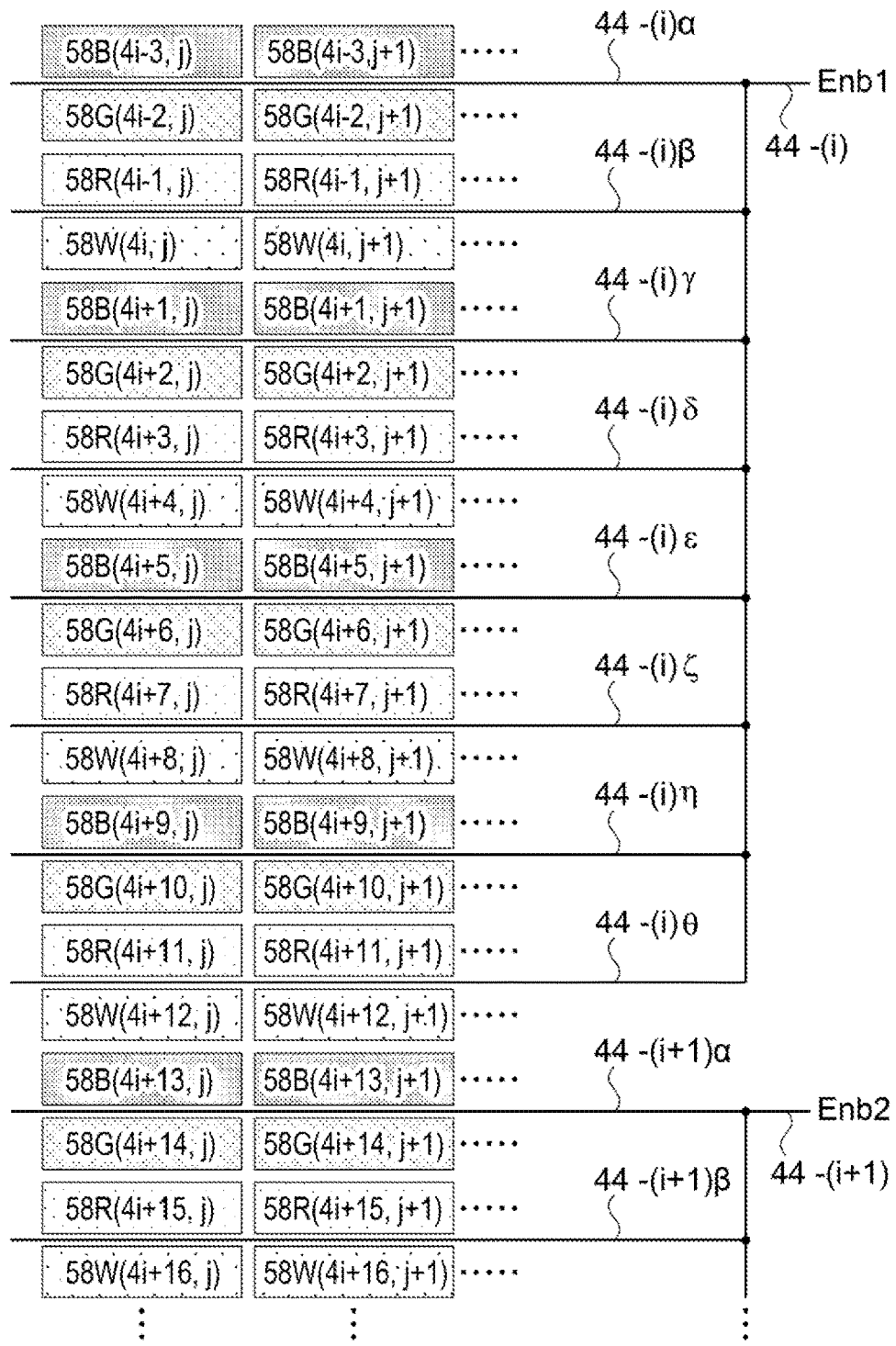
FIG. 11 is a diagram describing a configuration of a pixel according to a second embodiment.

FIG. 11 is a diagram illustrating a pixel configuration according to a second embodiment. The pixel configuration according to the second embodiment will be described below with reference to FIG. 11.

In the first embodiment, with r=3, the enable line 44 of one type is arranged for three sub-pixels 58. In addition, with p=3, one pixel 59 is composed of the blue sub-pixel 58B, the green sub-pixel 58G, and the red sub-pixel 58R. In contrast, in the second embodiment, with r=16, the enable line 44 of one type is arranged for, 16 sub-pixels 58. Further, the pixel 59 is composed of four sub-pixels 58 with an additionally provided white sub-pixel 58W. The other portions are substantially the same as those of the first embodiment, and therefore, in the second embodiment, portions different from those of the first embodiment will be described in detail, and descriptions of other overlapping portions will be omitted as appropriate.

In the second embodiment, the pixel 59 is composed of four sub-pixels 58, namely, the blue sub-pixel 58B, the green sub-pixel 58G, the red sub-pixel 58R, and the white sub-pixel 58W. For the white sub-pixel 58W, a color filter for white light may be prepared, or a white-light-emitting element 20 with no color filter may be provided. Further, the fourth color of the sub-pixel 58 is not limited to white, and may be other colors such as yellow or cyan.

In the second embodiment, as illustrated in FIG. 11, with r=16, the enable line 44 of one type is arranged for the sub-pixels 58 of 16 rows in the matrix of sub-pixel units, and the same enable signal Enb is supplied to four sub-pixels 58 in the vertical direction. Each of L enable lines 44 from the enable line driving circuit 54 branches into eight branch lines and supplies the same enable signal to the sub-pixels 58 of 16 rows. Specifically, the enable line 44-($i$) of the i-th row branches into eighth branch lines from the first branch line 44-($i$)α of the enable line to an eighth branch line 44-($i$)θ of the enable line. Each branch line is electrically connected with the sub-pixels 58 of the rows located above and below the line, and supplies an enable signal to the sub-pixels 58. For example, the first branch line 44-($i$)α is laid between the sub-pixels 58B (4i–3, any given column) at the (4i–3)-th row and any given column and the sub-pixels 58G (4i–2, any given column) at the (4i–2)-th row and any given column, and supplies an enable signal Enbi to the sub-pixels 58.

In the present embodiment, the pixel circuit 41 included in the sub-pixel 58B (4i–3, j) located at the (4i–3)-th row and the j-th column is the first pixel circuit, and the pixel circuit 41 included in the sub-pixel 58G (4i–2, j) located at the (4i–2)-th row and the j-th column is the second pixel circuit, the pixel circuit 41 included in the sub-pixel 58R (4i–1, j) located at the 4i-th row and the j-th column is the fifth pixel circuit, and the pixel circuit 41 included in the sub-pixel 58W (4i, j) located at the 4i-th row and the j-th column is the sixth pixel circuit. Likewise, the pixel circuit 41 included in the sub-pixel 58B (4i+13, j) located at the (4i+13)-th row and the j-th column is the third pixel circuit, the pixel circuit 41 included in the sub-pixel 58B (4i+14, j) located in the (4i+14)-th row and the j-th column is the fourth pixel circuit, the pixel circuit 41 included in the sub-pixel 58R (4i+15, j) located in the (4i+15)-th row and the j-th column is the seventh pixel circuit, and the pixel circuit 41 included in the sub-pixel 58W (4i+16, j) located at the (4i+16)-th row and the j-th column is the eighth pixel circuit. Thus, the first enable line 44, i.e., the enable line 44-($i$) of the i-th row, is electrically connected with the first pixel circuit, the second pixel circuit, the fifth pixel circuit, and the sixth pixel circuit, and the second enable line 44, i.e., the enable line 44-($i$+1) of the (i+1)-th row, is electrically connected with the third pixel circuit, the fourth pixel circuit, the seventh pixel circuit, and the eighth pixel circuit. In other words, in the enable line 44, unique wiring lines are arranged in units of four rows in the matrix of pixel units.

With the above-described configuration, light emission is collectively controlled for the pixels 59 of four rows in pixel units. Compared to the first embodiment, the number of the enable lines 44 is reduced. As a result, the frequency for switching the enable signal Enb can be reduced, and the operation of the enable line driving circuit 54 can be stabilized. In addition, the number of the output terminals of the enable line driving circuit 54 can be reduced, and thus the yield can be improved. Further, lower power consumption of the enable line driving circuit 54 can be achieved.

According to the second embodiment, the electro-optical device 10 that brightly displays high quality images with high resolution and multiple grey scales at low power consumption can be achieved. Further, since the plurality of pixel circuits 41 are simultaneously set to the light emission enabled state, the number of the enable lines 44 can be reduced and the frequency for switching the enable signal can be reduced.

Modification Examples

Further, the embodiments described above may be modified as follows.

The light emission is controlled for each pixel 59 with r=p=3 in Embodiment 1, and the light emission is controlled in units of four rows with r=16 and p=4 in the second embodiment. The combination of r and p is not limited thereto, and the light emission may be controlled in units of the pixels 59 of two rows arranged in the second direction, i.e., eight sub-pixels 58 arranged in the second direction with as r=8 and p=4, for example. Alternatively, the light emission may be controlled in units of the pixels 59 of two rows arranged in the second direction, i.e., six sub-pixels 58 arranged in the second direction with r=6 and p=3, or the light emission may be controlled in units of the pixels 59 of three rows arranged in the second direction, i.e., nine sub-pixels 58 arranged in the second direction with r=9 and p=3.

Figure 13:
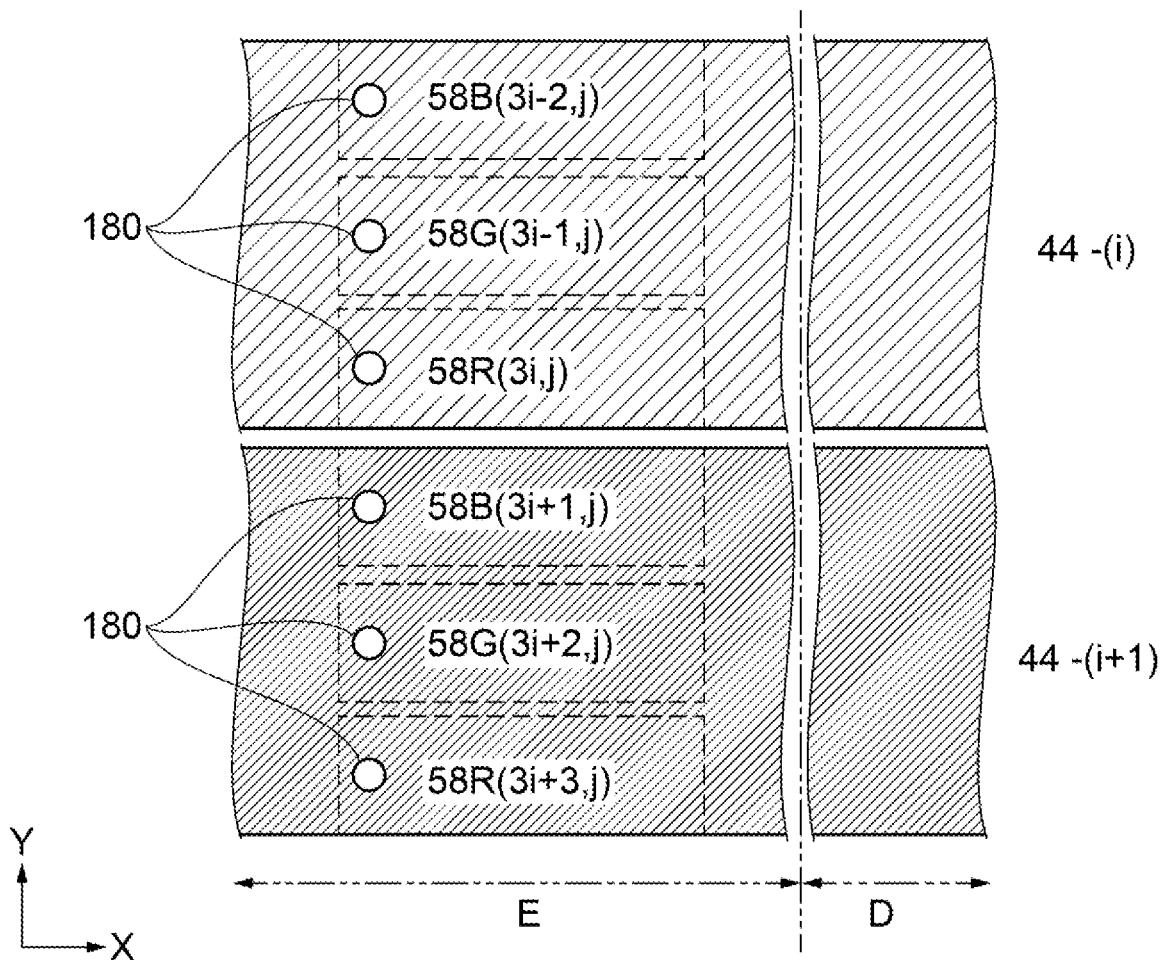
FIG. 13 is an enlarged diagram describing an enable wiring line of a modified example of the electro-optical device.

When the enable line 44-($i$) branches into the first branch line 44-($i$)α and the second branch line 44-($i$)β so as to be extended in the display area in the first direction and connected to the pixel circuit in the first embodiment, the enable line may be arranged without being branched as illustrated in FIG. 13. In this case, the enable lines need to be formed with wiring layers different from the first scan line 42 and the second scan line 45. For example, a wiring line layer for the enable line is provided between a pixel electrode layer that forms the positive electrode 21 and an electrode layer that forms the data line and the power source line, or between a pixel electrode layer that forms the positive electrode 21 and an electrode layer that forms the first scan line 42 and the second scan line 45. In this case, the pixel electrode, the drain of the first transistor 31, and the positive electrode 21 are connected via a notch or a contact hole 180 provided in the enable line 44a.

While an organic EL element is used as the light-emitting element 20 in the above-described embodiments, the present disclosure is not limited thereto, and a light emitting diode element such as gallium nitride (GaN), a semiconductor laser element, and the like may be used as the light-emitting element 20.

While the organic EL device in which the light-emitting elements 20 composed of organic EL elements are arranged in 2160 (720×3) rows×1280 columns on the first substrate 11 composed of a single crystal semiconductor substrate (single crystal silicon substrate) is described as an example of the electro-optical device in the above-described embodiments, the electro-optical device of the present disclosure is not limited to such a configuration. For example, the electro-optical device may have a configuration in which, as transistors, thin film transistors (TFTs) are formed on the element substrate 11 composed of a glass substrate, or may have a configuration in which TFTs are formed on a flexible substrate made of polyimide and the like. Further, the electro-optical device may be a micro-LED display in which micro LED elements are densely arranged as light-emitting elements, or may be a quantum dot display using a nano-sized semiconductor crystal material for light-emitting elements. The electro-optical device may use, as a color filter, quantum dots that can convert incident light into light with a different wavelength.

While the electronic apparatus has been described in the above-described embodiments by taking as an example, the see-through head-mounted display 100 incorporating the electro-optical device 10, the electro-optical device 10 of the present disclosure is also applicable to other electronic apparatuses including a closed-type head-mounted display. Other types of electronic apparatus include, for example, projectors, rear-projection televisions, direct-viewing televisions, cell phones, portable audio devices, personal computers, video camera monitors, automotive navigation devices, head-up displays, pagers, electronic organizers, calculators, wearable devices such as wristwatches, hand-held displays, word processors, workstations, video phones, POS terminals, digital still cameras, signage displays, and the like.

Contents derived from the embodiments will be described below.

The electro-optical device includes a scan line, a data line, a pixel circuit provided corresponding to an intersection between the scan line and the data line, and an enable line, wherein the pixel circuit includes a memory circuit, a light-emitting element, and a control circuit, the light-emitting element changes luminance in accordance with an image signal retained in the memory circuit, the control circuit controls a light emission enabled state of the light-emitting element, the pixel circuit includes a first pixel circuit, a second pixel circuit, a third pixel circuit, and a fourth pixel circuit, the enable line includes a first enable line and a second enable line, the first pixel circuit and the second pixel circuit are electrically connected with the first enable line, and the third pixel circuit and the fourth pixel circuit are electrically connected with the second enable line.

According to the above configuration, the pixel circuit includes a memory circuit, thus, a digital signal expressed by binary values of ON/OFF can be written into the memory circuit, and the pixel circuit can control the ratio between the light emission and the non-light emission of the light-emitting element to perform a gray-scale display. Further, the pixel circuit includes a control circuit that controls the light emission and the non-light emission independently from the memory circuit, thus, the pixel circuit can independently control the period in which the image signal is written into the memory circuit and the period in which the light-emitting element is in a state of being able to emit light. Accordingly, in each of the pixel circuits, since it becomes possible that the light-emitting element is set into the non-light emission state during a period in which the image signal is being written into the memory circuit, and the light-emitting element is set into a state of being able to emit light assuming a predetermined time to be the display period after the image signal has been written into the memory circuit, an accurate gray scale expression can be achieved by time-division driving. In addition, the plurality of pixel circuits can be set into the light emission enabled state at the same time. That is, light from the light-emitting element corresponding to the plurality of pixel circuits can be mixed and emitted. In addition, one enable signal is provided for the respective plurality of sub-pixels, making it possible to reduce the number of the enable lines, and to retard (lower) the frequency for switching the enable signal.

The electro-optical device described above may be configured such that a selection signal or a non-selection signal is supplied to the scan line, when the selection signal is supplied, the pixel circuit sets the data line and the memory circuit into a conductive state, while when the non-selection signal is supplied, the pixel circuit sets the data line and the memory circuit into a non-conductive state, a second selection period in which the selection signal is supplied to the second pixel circuit is provided after a first selection period in which the selection signal is supplied to the first pixel circuit, and the first activation period in which an activation signal is supplied to the first enable line is provided after the second selection period.

According to the above configuration, after an introduction of image signals into the first pixel circuit and the second pixel circuit, the light-emitting element corresponding to the two pixel circuits can be set into the light emission enabled state at the same time.

The electro-optical device described above may be configured such that the first activation period starts within one vertical period from a time at which the first selection period starts.

According to the above configuration, after an introduction of image signals into the first pixel circuit and the second pixel circuit, it is not necessary to wait for the end of the introduction of image signals into the whole pixel circuits, and the light-emitting elements corresponding to the two pixel circuits can be simultaneously set into the light emission enabled state at an appropriate timing after the introduction of the image signals.

The electro-optical device described above may be configured such that a third selection period in which the selection signal is supplied to the third pixel circuit is provided after the second selection period, and the first activation period and the third selection period have an overlapped period.

According to the above configuration, an image signal can be introduced into the third pixel circuit during a period in which the light-emitting elements corresponding to the first pixel circuit and the second pixel circuit is in the light emission enabled state.

The electro-optical device described above may be configured such that a fourth selection period in which the selection signal is supplied to the fourth pixel circuit is provided after the third selection period, and a second activation period in which the activation signal is supplied to the second enable line is provided after the fourth selection period.

According to the above configuration, after an introduction of the image signals into the third pixel circuit and the fourth pixel circuit, the light-emitting elements corresponding to the two pixel circuits can be set into the light emission enabled state at the same time.

The electro-optical device described above may be configured such that the enable line is supplied with an activation signal or a non-activation signal, the control circuit sets the light-emitting element into a state of being configured to emit light when the activation signal is supplied, and a time at which the activation signal starts being supplied to the first enable line differs from a time at which the activation signal starts being supplied to the second enable line.

According to the above configuration, the period in which the light-emitting element corresponding to the first enable line is set into the light emission enabled state can be shifted from the light-emitting element corresponding to the second enable line is set into the light emission enabled state.

The electro-optical device described above may be configured such that a time difference between a time at which the activation signal starts to be supplied to the first enable line and a time at which the activation signal starts to be supplied to the second enable line is shorter than one vertical period.

According to the above configuration, after setting the light-emitting element corresponding to the first enable line into the light emission enabled state, the light-emitting element corresponding to the second enable line can be set into the light emission enabled state at an appropriate timing after a time lapse of a required minimum amount of time.

The electro-optical device described above may be configured such that the first pixel circuit, the second pixel circuit, the third pixel circuit, and the fourth pixel circuit are arranged along a second direction, and the enable line extends in a first direction intersecting the second direction.

According to the above configuration, the sub-pixels aligned in the first direction can be set to a group for each of a plurality of rows, making it possible to control the light emission enabled state of a group of light-emitting elements with a simple configuration.

The electro-optical device described above may be configured such that the light-emitting element included in the first pixel circuit and the light-emitting element included in the third pixel circuit display a first color, and the light-emitting element included in the second pixel circuit and the light-emitting element included in the fourth pixel circuit display a second color.

According to the above configuration, the light emission enabled state of the light-emitting element can be controlled for each of the pixels that enable a color display.

An electronic apparatus includes the electro-optical device described above.

According to this configuration, a high-quality image can be displayed on the electronic apparatus such as a head-mounted display, and the like.

What is claimed is:

1. An electro-optical device comprising:
    a first pixel circuit that emits a first color;
    a second pixel circuit that emits a second color different from the first color;
    a third pixel circuit that emits a third color different from the first color and the second color;
    a first enable line;
    a second enable line that is branched from the first enable line;
    a first scan line;
    a second scan line;
    a third scan line; and
    a data line, wherein
    the first pixel circuit and the second pixel circuit are electrically connected to the first enable line,
    the third pixel circuit is electrically connected to the second enable line,
    the first pixel circuit is electrically connected to the first scan line and the data line,
    the second pixel circuit is electrically connected to the second scan line and the data line, and
    the third pixel circuit is electrically connected to the third scan line and the data line.
2. The electro-optical device according to claim 1, wherein
    the first pixel circuit includes a first memory circuit, a first light emitting element and a first control circuit,
    the second pixel circuit includes a second memory circuit, a second light emitting element and a second control circuit, and
    the third pixel circuit includes a third memory circuit, a third light emitting element and a third control circuit.
3. The electro-optical device according to claim 1, wherein
    the first pixel circuit, the second pixel circuit, and the third pixel circuit are arranged along a second direction, and
    the first enable line and the second enable line extend in a first direction intersecting the second direction.
4. An electronic apparatus comprising the electro-optical device according to claim 1.
5. The electro-optical device according to claim 1, further comprising:
    a fourth pixel circuit that emits a fourth color different from the first color, the second color, and the third color, wherein
    the fourth pixel circuit is electrically connected to the second enable line.
6. The electro-optical device according to claim 1, further comprising:
    a fourth pixel circuit that emits a fourth color different from the first color, the second color, and the third color; and
    a fourth scan line, wherein
    the fourth pixel circuit is electrically connected to the second enable line, and
    the fourth pixel circuit is electrically connected to the fourth scan line and the data line.
7. An electro-optical device comprising:
    a first scan line extending in a first direction;
    a second scan line extending in the first direction;
    a third scan line extending in the first direction;
    a data line extending in a second direction that intersects the first direction;
    a first pixel circuit located at a position corresponding to an intersection of the first scan line and the data line, electrically connected to the first scan line and the data line, and including a first light emitting element and a first control circuit;
    a second pixel circuit located at a position corresponding to an intersection of the second scan line and the data line, electrically connected to the second scan line and the data line, and including a second light emitting element and a second control circuit;
    a third pixel circuit located at a position corresponding to an intersection of the third scan line and the data line, electrically connected to the third scan line and the data line, and including a third light emitting element and a third control circuit; and
    an enable line extending in the first direction and being overlapped with the first control circuit, the second control circuit, and the third control circuit in a plan view.
8. The electro-optical device according to claim 7, wherein
    the enable line is positioned between the first control circuit and the first light emitting element in a cross-section view.
9. The electro-optical device according to claim 8, wherein
    the first control circuit and the first light emitting element are connected via a contact hole provided in the enable line.
10. The electro-optical device according to claim 8, wherein the first control circuit and the first light emitting element are connected via a notch hole provided in the enable line.

11. The electro-optical device according to claim 7, wherein
the enable line is connected to the first control circuit, the second control circuit, and the third control circuit.

12. An electro-optical device comprising:
a data line extending in a first direction;
a first pixel circuit including a first light emitting element and a first control circuit;
a second pixel circuit including a second light emitting element and a second control circuit; and
a third pixel circuit including a third light emitting element and a third control circuit, wherein
the first pixel circuit, the second pixel circuit, and the third pixel circuit are arranged along the first direction,
an enable line is positioned between the first light emitting element and the first control circuit, and
the enable line is overlapped with the first control circuit, the second control circuit, and the third control circuit in a plan view.

13. The electro-optical device according to claim 12, wherein
the enable line is electrically connected to the first control circuit, the second control circuit, and the third control circuit.

14. The electro-optical device according to claim 12, wherein
the enable line is positioned between the first pixel circuit and the first light emitting element in a cross-section view.

15. The electro-optical device according to claim 14, wherein
a second light emitting element is positioned above the second pixel circuit and connected to the second pixel circuit,
a third light emitting element is positioned above the third pixel circuit and connected to the third pixel circuit,
the enable line is positioned between the second pixel circuit and the second light emitting element in the cross-section view, and
the enable line is positioned between the third pixel circuit and the third light emitting element in the cross-section view.

16. The electro-optical device according to claim 15, wherein
the first control circuit and the first light emitting element are connected via a first contact hole provided in the enable line.

* * * * *